US012094648B1

(12) United States Patent
Lin et al.

(10) Patent No.: US 12,094,648 B1
(45) Date of Patent: Sep. 17, 2024

(54) METHOD FOR PRODUCING A MAGNETIC DEVICE

(71) Applicant: CHILISIN ELECTRONICS CORP., Taoyuan (TW)

(72) Inventors: Chun-Chih Lin, Taoyuan (TW); Shou-Yi Tsao, Taoyuan (TW)

(73) Assignee: CHILISIN ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/383,514

(22) Filed: Oct. 25, 2023

(30) Foreign Application Priority Data

Jun. 30, 2023 (TW) ................................ 112124488

(51) Int. Cl.

| | |
|---|---|
| ***H01F 7/06*** | (2006.01) |
| ***H01F 27/02*** | (2006.01) |
| ***H01F 27/28*** | (2006.01) |
| ***H01F 41/04*** | (2006.01) |

(52) U.S. Cl.
CPC ............ *H01F 41/04* (2013.01); *H01F 27/02* (2013.01); *H01F 27/28* (2013.01)

(58) Field of Classification Search
CPC ........... H01F 41/04; H01F 27/02; H01F 27/28
See application file for complete search history.

(56) References Cited

U.S. PATENT DOCUMENTS

| | | | | |
|---|---|---|---|---|
| 6,087,917 A * | 7/2000 | Roessler | H01F 27/022 336/100 |
| 9,818,534 B2 * | 11/2017 | Sakamoto | H01F 41/02 |
| 2021/0383954 A1 * | 12/2021 | Chen | H01F 27/2828 |

FOREIGN PATENT DOCUMENTS

| | | | |
|---|---|---|---|
| CN | 213400848 U | 6/2021 |
| TW | 577093 B | 2/2004 |
| TW | 200839802 A | 10/2008 |
| TW | I798979 B | 4/2023 |

* cited by examiner

*Primary Examiner* — Paul D Kim
(74) *Attorney, Agent, or Firm* — Li & Cai Intellectual Property (USA) Office

(57) ABSTRACT

A magnetic device and a method for producing the same are provided. The magnetic device produced by the method includes a main body that is integrally formed. The method includes a preparing process, a coil assembling process, a placing process, and a forming process. The preparing process is implemented by producing a bottom seat and a lid. The coil assembling process is implemented by fixing a coiling to the bottom seat for formation of a first semi-finished product. The placing process is implemented by placing the first semi-finished product into a mold and placing the lid onto the first semi-finished product for formation of a second semi-finished product. The forming process is implemented by pressurizing the second semi-finished product, such that the bottom seat and the lid are melted and connected to each other to form the main body. The coil is correspondingly encompassed by the main body.

7 Claims, 26 Drawing Sheets

METHOD FOR PRODUCING A MAGNETIC DEVICE

CROSS-REFERENCE TO RELATED PATENT APPLICATION

This application claims the benefit of priority to Taiwan Patent Application No. 112124488, filed on Jun. 30, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a magnetic device and a method for producing the same, and more particularly to a magnetic device applicable as an inductor and a method for producing the same.

BACKGROUND OF THE DISCLOSURE

Generally, in a conventional method for producing an inductor, a coil is placed into a mold, and magnetic powders are then filled into the mold. Finally, the magnetic powders are formed into a magnetic main body by way of heating and pressurizing. For the magnetic main body produced in such a manner, an issue where a density of some regions are apparently higher than or lower than that of other regions may easily occur, thereby directly affecting a magnetic property of the inductor.

SUMMARY OF THE DISCLOSURE

In response to the above-referenced technical inadequacy, the present disclosure provides a magnetic device and a method for producing the same, which are mainly configured to improve a poor magnetic property of an existing magnetic device (e.g., an inductor) caused by an excessive density difference at difference regions of a magnetic main body of the inductor that is produced by a conventional method.

In order to solve the above-mentioned problem, one of the technical aspects adopted by the present disclosure is to provide a method for producing a magnetic device. The magnetic device includes a main body that is integrally formed. The method includes a preparing process, a coil assembling process, a placing process, and a forming process. The preparing process is implemented by using one or more magnetic mixture to form a bottom seat and a lid. One side of the lid is recessed to form a groove, and the lid includes a column arranged in the groove. The coil assembling process is implemented by fixing a coil to the bottom seat for formation of a first semi-finished product. The coil includes a winding portion, a first end portion, and a second end portion, in which one end of the first end portion is connected to a top portion of the winding portion, and one end of the second end portion is connected to a bottom portion of the winding portion. An outer diameter of the winding portion is less than a width of the bottom seat, the outer diameter of the winding portion is less than a length of the bottom seat, the outer diameter of the winding portion is less than an inner diameter of the groove, an inner diameter of a center hole of the winding portion is greater than an outer diameter of the column, and a depth of the groove is greater than or equal to a height of the winding portion. The placing process is implemented by placing the first semi-finished product into a mold and placing the lid onto the first semi-finished product for formation of a second semi-finished product. An end surface of the lid of the second semi-finished product has the groove, one portion of the end surface of the lid of the second semi-finished product correspondingly abuts against one section of the first end portion that is adjacent to the top portion of the winding portion, the lid is supported by a partial section of the first end portion, the column is correspondingly arranged above the center hole of the winding portion, and the winding portion is correspondingly arranged below the groove. The forming process is implemented by pressurizing the second semi-finished product, such that the lid and the bottom seat of the second semi-finished product are melted and connected to each other to form the main body. The winding portion is correspondingly arranged in the main body, and one portion of another end of the first end portion and one portion of another end of the second end portion are exposed from the main body.

In order to solve the above-mentioned problem, another one of the technical aspects adopted by the present disclosure is to provide a method for producing a magnetic device. The magnetic device includes a main body that is integrally formed. The method includes a preparing process, a coil assembling process, a placing process, and a forming process. The preparing process is implemented by using one or more magnetic mixture to form a bottom seat and a lid. One side of the lid is recessed to form a groove and an avoidance groove that is in spatial communication with the groove, and the lid includes a column arranged in the groove. The coil assembling process is implemented by fixing a coil to the bottom seat for formation of a first semi-finished product. The coil includes a winding portion, a first end portion, and a second end portion, one end of the first end portion is connected to a top portion of the winding portion, another end of the first end portion bends from a first side of the bottom seat to a second side of the bottom seat, one end of the second end portion is connected to a bottom portion of the winding portion, and another end of the second end portion bends from the first side to the second side. An outer diameter of the winding portion is less than a width of the bottom seat, the outer diameter of the winding portion is less than a length of the bottom seat, the outer diameter of the winding portion is less than an inner diameter of the groove, an inner diameter of a center hole of the winding portion is greater than an outer diameter of the column, and a depth of the groove is greater than or equal to a height of the winding portion. The placing process is implemented by placing the first semi-finished product into a mold and placing the lid onto the first semi-finished product for formation of a second semi-finished product. The winding portion of the second semi-finished product is correspondingly arranged in the groove, one section of the first end portion that is connected to the top portion of the winding portion is correspondingly arranged in the avoidance groove, and the column is correspondingly arranged in the center hole. The forming process is implemented by pressurizing the second semi-finished product, such that the lid and the bottom seat of the second semi-finished product are melted and connected to each other to form the main body.

The winding portion is correspondingly arranged in the main body, and one portion of another end of the first end portion and one portion of another end of the second end portion are exposed from the main body.

In order to solve the above-mentioned problem, yet another one of the technical aspects adopted by the present disclosure is to provide a magnetic device produced by one of the above-mentioned methods.

In order to solve the above-mentioned problem, still another one of the technical aspects adopted by the present disclosure is to provide a magnetic device. The magnetic device includes a lid, a bottom seat, and a coil. The lid has one side that is recessed to form a groove, and includes a column arranged in the groove. The coil includes a winding portion, a first end portion, and a second end portion. One end of the first end portion is connected to a top portion of the winding portion, and one end of the second end portion is connected to a bottom portion of the winding portion. The winding portion is disposed at one side of the base, an outer diameter of the winding portion is less than a width of the bottom seat, the outer diameter of the winding portion is less than a length of the bottom seat, the outer diameter of the winding portion is less than an inner diameter of the groove, an inner diameter of a center hole of the winding portion is greater than an outer diameter of the column, and a depth of the groove is greater than or equal to a height of the winding portion. The lid is configured to be disposed at the one side of the base that has the coil disposed thereon.

Therefore, in the magnetic device and the method for producing the same provided by the present disclosure, through the design of the preparing process, the coil assembling process, the placing process, and the forming process, issues of the inductor produced by the conventional method can be effectively improved. In the magnetic device produced by the method of the present disclosure, a density of the main body at each region is substantially uniform. Compared with the magnetic device produced by the conventional method, the magnetic device of the present disclosure has a better magnetic property and better reliability.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
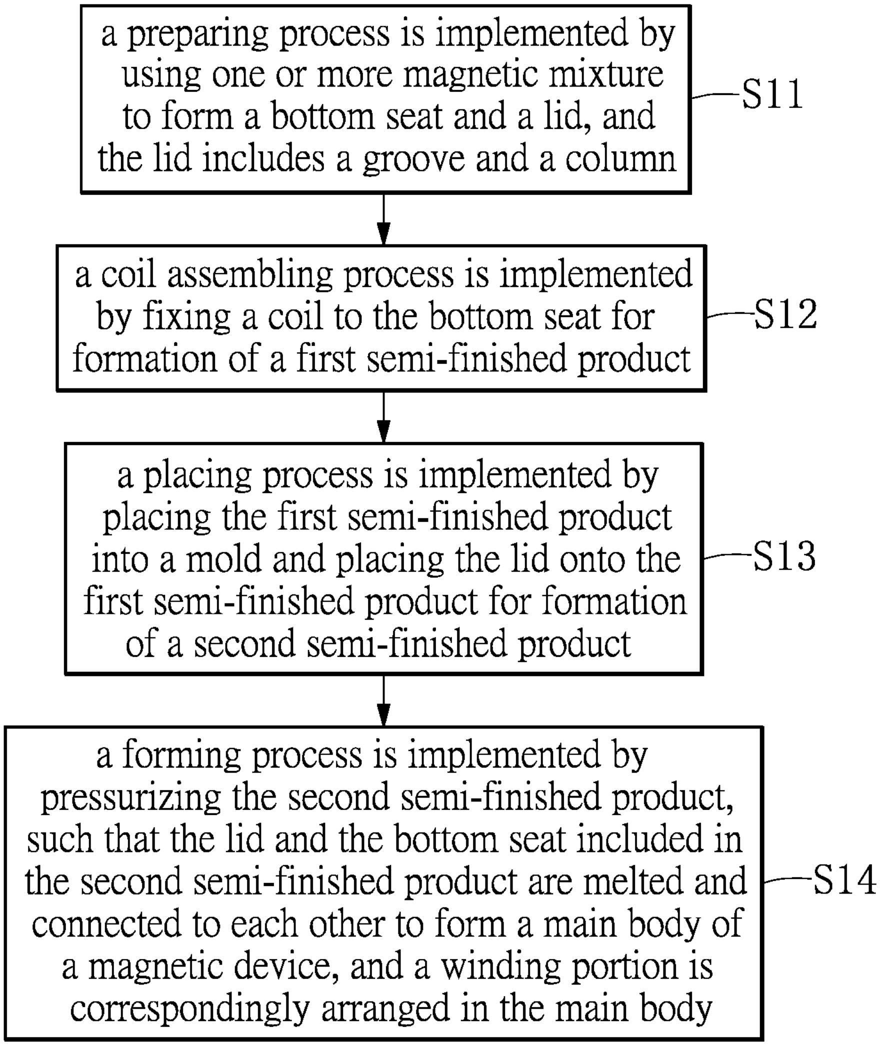
FIG. 1 is a flowchart of a method for producing a magnetic device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 15:
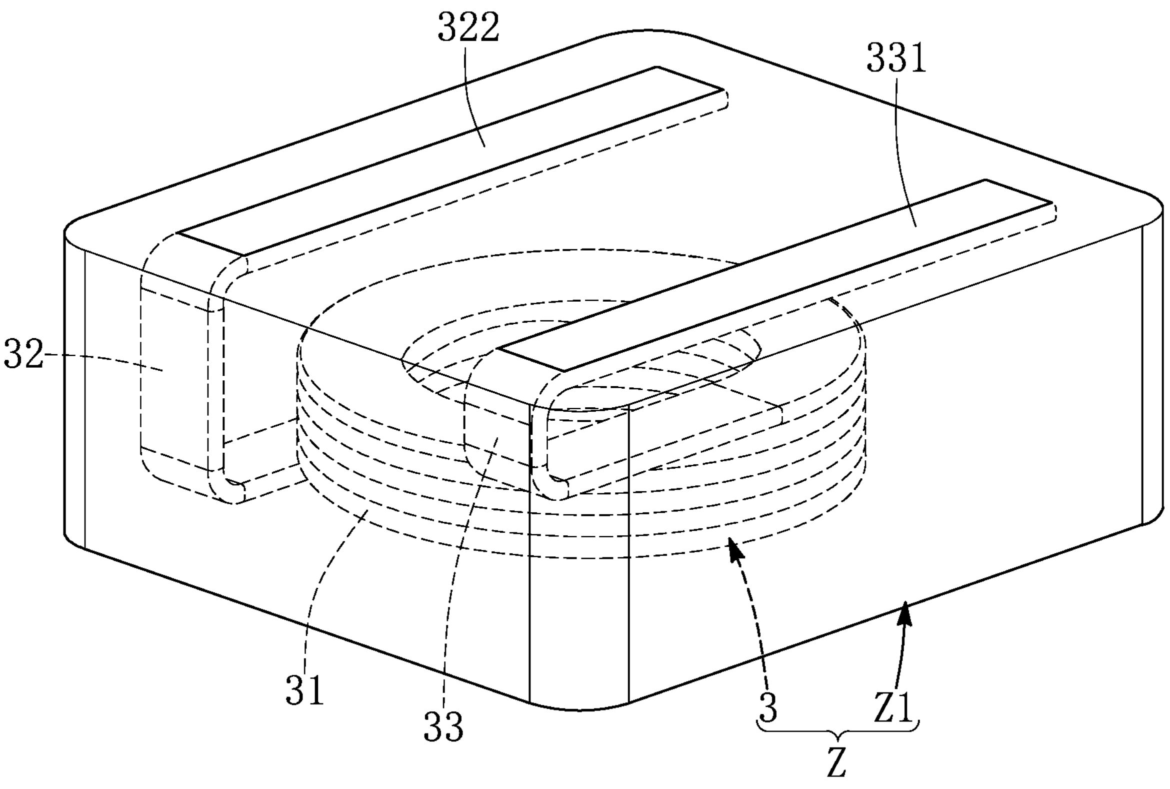
FIG. 15 is a schematic view of the magnetic device produced by the method for producing the magnetic device according to the first embodiment of the present disclosure.

Referring to FIG. 1, FIG. 1 is a schematic flowchart of a method for producing a magnetic device according to a first embodiment of the present disclosure. The method for producing a magnetic device of the present disclosure is configured to produce a magnetic device Z (as shown in FIG. 15), and the magnetic device Z includes a main body Z1 that is integrally formed. The method includes a preparing process S11, a coil assembling process S12, a placing process S13, and a forming process S14.

The preparing process S11 is implemented by using one or more magnetic mixture to produce a bottom seat 1 and a lid 2. In a practical application, a same magnetic mixture can be used to produce the bottom seat 1 and the lid 2 in a molding manner, and the finally-formed main body Z1 of the magnetic device Z can be made of the same magnetic powders, but the present disclosure is not limited thereto. In other embodiments, the bottom seat 1 and the lid 2 can also be produced by different magnetic mixtures, respectively. For example, the magnetic mixture can include an adhesive, and the magnetic mixture can further include at least one of crystalline magnetic metal powders and amorphous magnetic metal powders. The crystalline magnetic metal powders can be, for example, Fe—Si powders, Fe—Si—Cr powders, Fe—Si—Al powders, Fe—Ni powders, carbonyl iron powders (i.e., CIP), iron powders, Fe—Ni—Mo powders, and Fe—Co—V powders, but the present disclosure is not limited thereto. The amorphous magnetic metal powders can be Fe-based amorphous magnetic metal powders, such as FeSiBC powders and FeSiCrBPC powders, but the present disclosure is not limited thereto.

Figure 2:
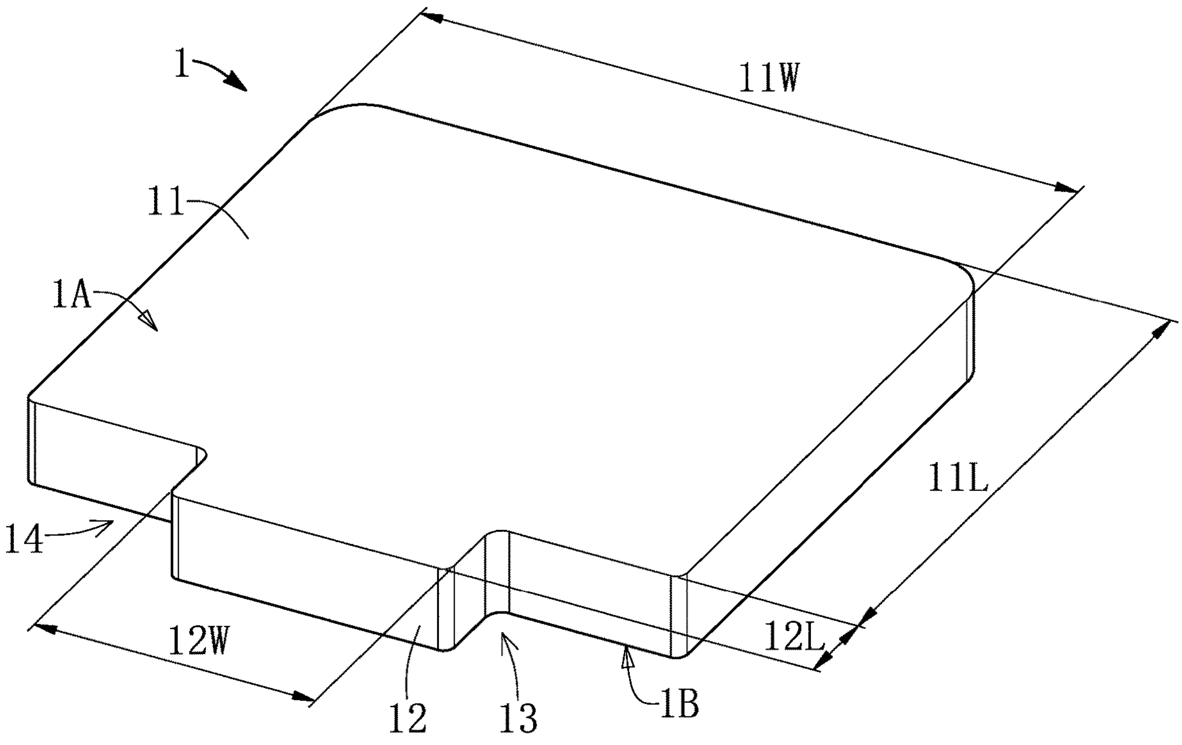
FIG. 2 and FIG. 3 are respectively schematic views of a bottom seat and a lid produced in a preparing process of the method for producing the magnetic device according to the first embodiment of the present disclosure.
Figure 3:
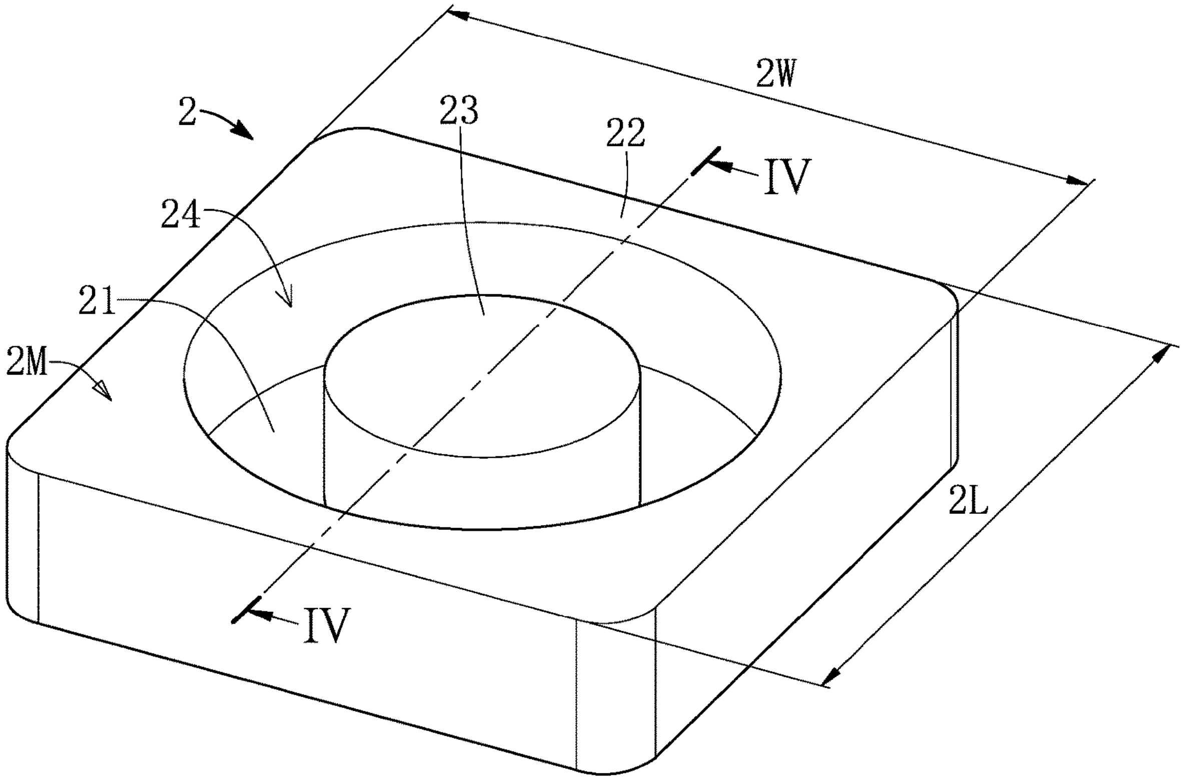

Referring to FIG. 2 and FIG. 3, FIG. 2 and FIG. 3 are schematic views of a bottom seat and a lid produced in a preparing process of the method for producing the magnetic device according to the first embodiment of the present disclosure. As shown in FIG. 2, the bottom seat 1 can have a base 11 and a protrusion 12. The protrusion 12 is connected to one side of the base 11, and a width 12W of the protrusion 12 is less than a width 11W of the base 11. In addition, at the one side of the base 11, the protrusion 12 and the base 11 jointly define a first notch 13 and a second notch 14. A sum of a length 11L of the base 11 and a length 12L of the protrusion 12 is greater than or equal to a length 2L of the lid 2, and the width 11L of the base 11 is greater than or equal to a width 2W of the lid 2. In other words, from a top view of the bottom seat 1, the bottom seat 1 substantially has the shape of an inverted T. In other embodiments, the bottom seat 1 can have only the base 11 and not the protrusion 12, and an overall structure of the bottom seat 1 is substantially a rectangular board.

Figure 4:
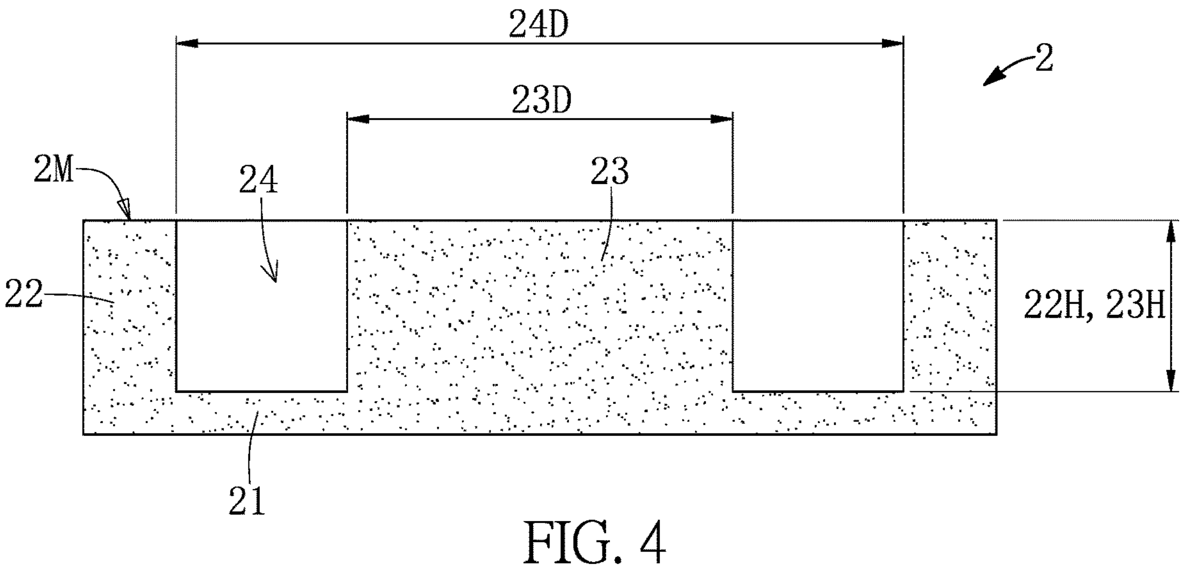
FIG. 4 is a schematic sectional view of the lid produced in the preparing process of the method for producing the magnetic device according to the first embodiment of the present disclosure.

Referring to FIG. 3 and FIG. 4, the lid 2 can include a bottom wall 21, an annular side wall 22, and a column 23. The annular side wall 22 is disposed around the bottom wall 21, one end of the column 23 is disposed on the bottom wall 21, and the bottom wall 21, the annular side wall 22, and the column 23 jointly define a groove 24. The groove 24 is arranged at one side of the lid 2. From a top view of the lid 2, a peripheral edge of the groove 24 is substantially in a circular shape, but the present disclosure is not limited thereto. In other embodiments, the peripheral edge of the groove 24 can be substantially in an oval shape or in a rectangular shape. The groove 24 is in an annular shape, and the column 23 is substantially arranged at a central position of the groove 24, but the present disclosure is not limited thereto. The column 23 can be in a cylindrical shape or a rectangular cubic shape, but the present disclosure is not limited thereto. In a practical application, a height 23H of the column 23 is less than or equal to a height 22H of the annular side wall 22, so as to facilitate manufacturing of the lid 2. Naturally, in other embodiments, the height 23H of the column 23 can be greater than the height 22H of the annular side wall 2, and one portion of the column 23 protrudes outside of the groove 24.

Figure 5:
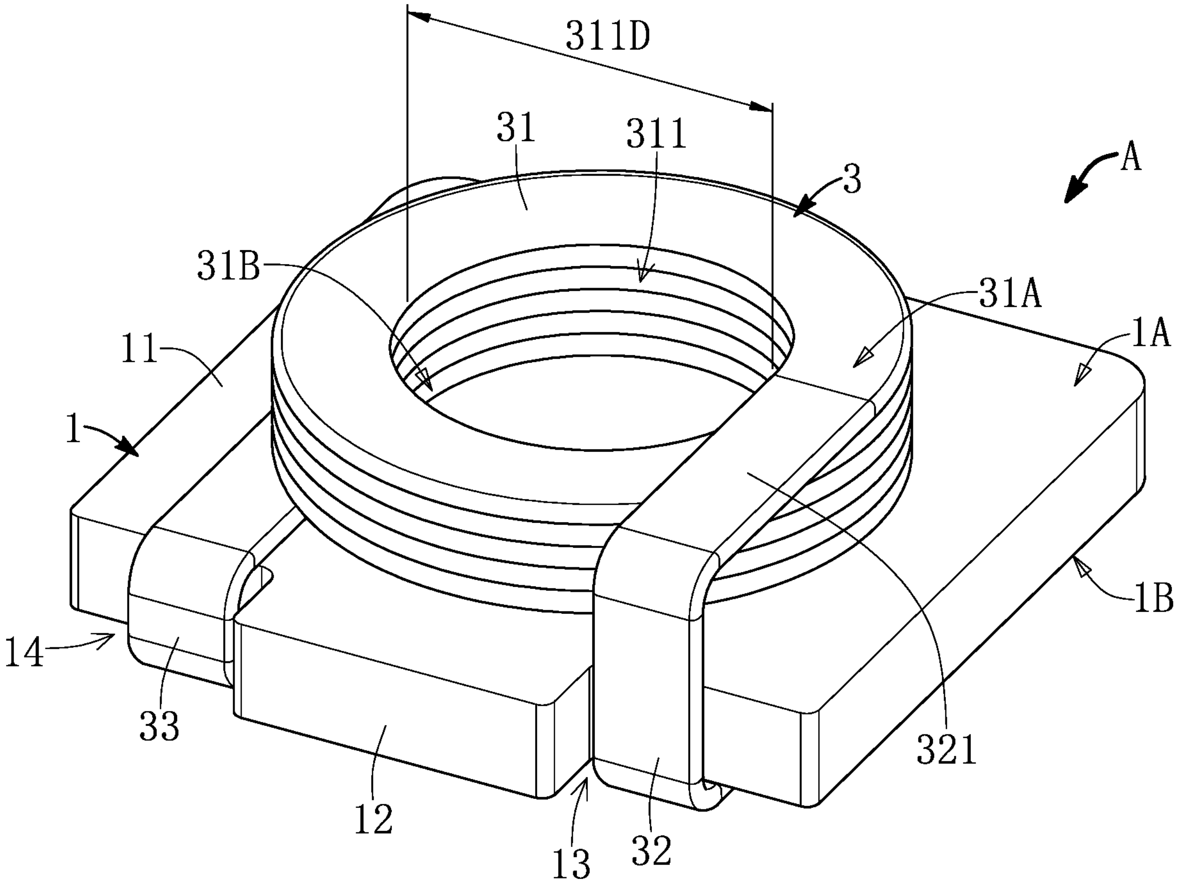
FIG. 5 to FIG. 7 are schematic views of a first semi-finished product produced in a coil assembling process of the method for producing the magnetic device according to the first embodiment of the present disclosure from different perspectives.
Figure 6:
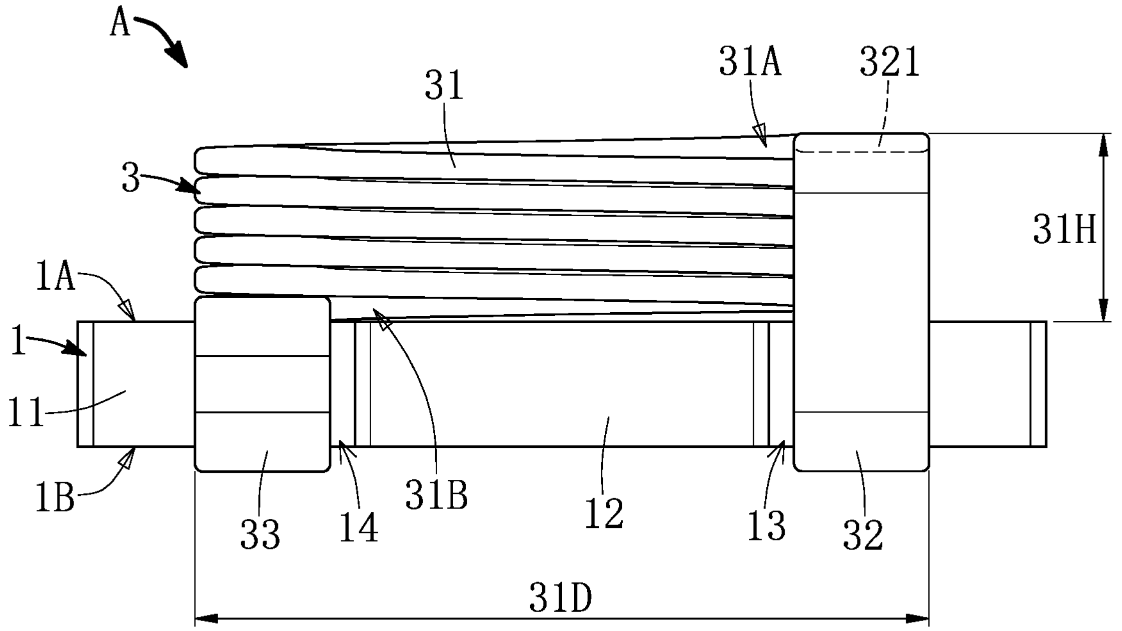
Figure 7:
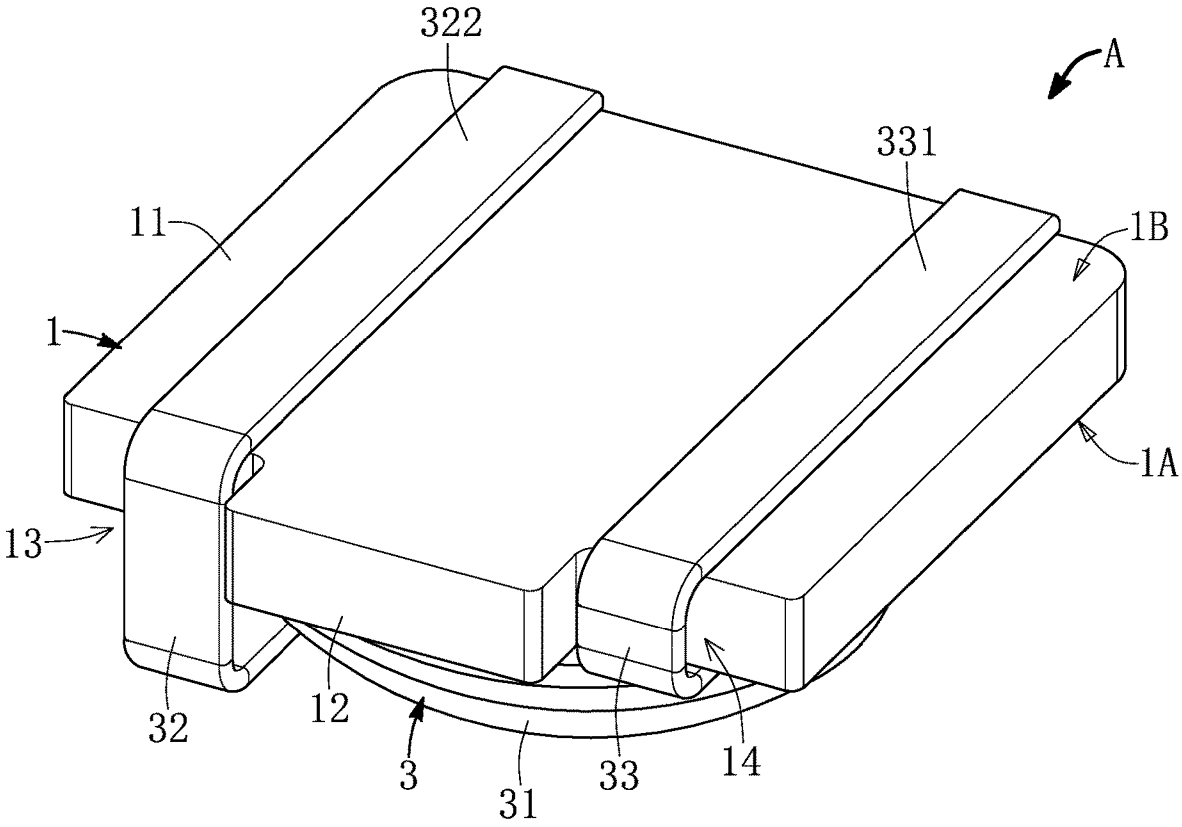

Referring to FIG. 1, FIG. 4, and FIG. 5, FIG. 4 is a schematic sectional view of the lid produced in the preparing process of the method for producing the magnetic device according to the first embodiment of the present disclosure, and FIG. 5 is a schematic view of a first semi-finished product produced in a coil assembling process of the method for producing the magnetic device according to the first embodiment of the present disclosure. The coil assembling process S12 is implemented by fixing a coil 3 to the bottom seat 1 to form a first semi-finished product A.

The coil 3 includes a winding portion 31, a first end portion 32, and a second end portion 33. One end of the first end portion 32 is connected to a top portion 31A of the winding portion 31, another end of the first end portion 32 bends from a first side 1A of the bottom seat 1 to a second side 1B of the bottom seat 1, one end of the second end portion 33 is connected to a bottom portion 31B of the winding portion 31, and another end of the second end portion 33 bends from the first side 1A to the second side 1B. An outer diameter 31D of the winding portion 31 is less than the width 11W of the bottom seat 1, and the outer diameter 31D of the winding portion 31 is less than a length of the bottom seat 1 (i.e., a sum of the length 11L of the base 11 and the length 12L of the protrusion 12). The coil 3 can be made of a flat enameled wire (commonly known as a flat wire), but the present disclosure is not limited thereto. In other embodiments, the coil 3 can be made of a non-flat enameled wire (commonly known as a round wire).

In the coil assembling process S12, a partial section of the first end portion 32 bends to the second side 1B of the bottom seat 1 through the first notch 13, a partial section of the second end portion 33 bends to the second side 1B of the bottom seat 1 through the second notch 14, and the coil 3 is fixed with the bottom seat 1 by the design of the partial section of the first end portion 32 and the partial section of the second end portion bending from the first side 1A to the second side 1B.

Reference is made to FIG. 3 to FIG. 6. It is worth mentioning that, the outer diameter 31D of the winding portion 31 is less than an inner diameter 24D of the groove 24, an inner diameter 311D of a center hole 311 of the winding portion 31 is greater than an outer diameter 23D of the column 23, and a depth of the groove 24 (i.e., the height 22H of the annular side wall 22) is greater than or equal to a height 31H of the winding portion 31.

It should be noted that, in the drawings of the present disclosure, the another end of the first end portion 32 and the another end of the second end portion 33 are arranged at the second side 1B of the bottom seat 1, but the position of each of the another end of the first end portion 32 and the another end of the second end portion 33 relative to the bottom seat 1 is not limited thereto. For example, in another embodiment, the another end of the first end portion 32 and the another end of the second end portion 33 can be arranged at a narrow side of the bottom seat 1. Or, in yet another embodiment, the another end of the first end portion 32 and the another end of the second end portion 33 can bend from the second side 1B of the bottom seat 1 to the first side 1A of the bottom seat 1.

Figure 8:
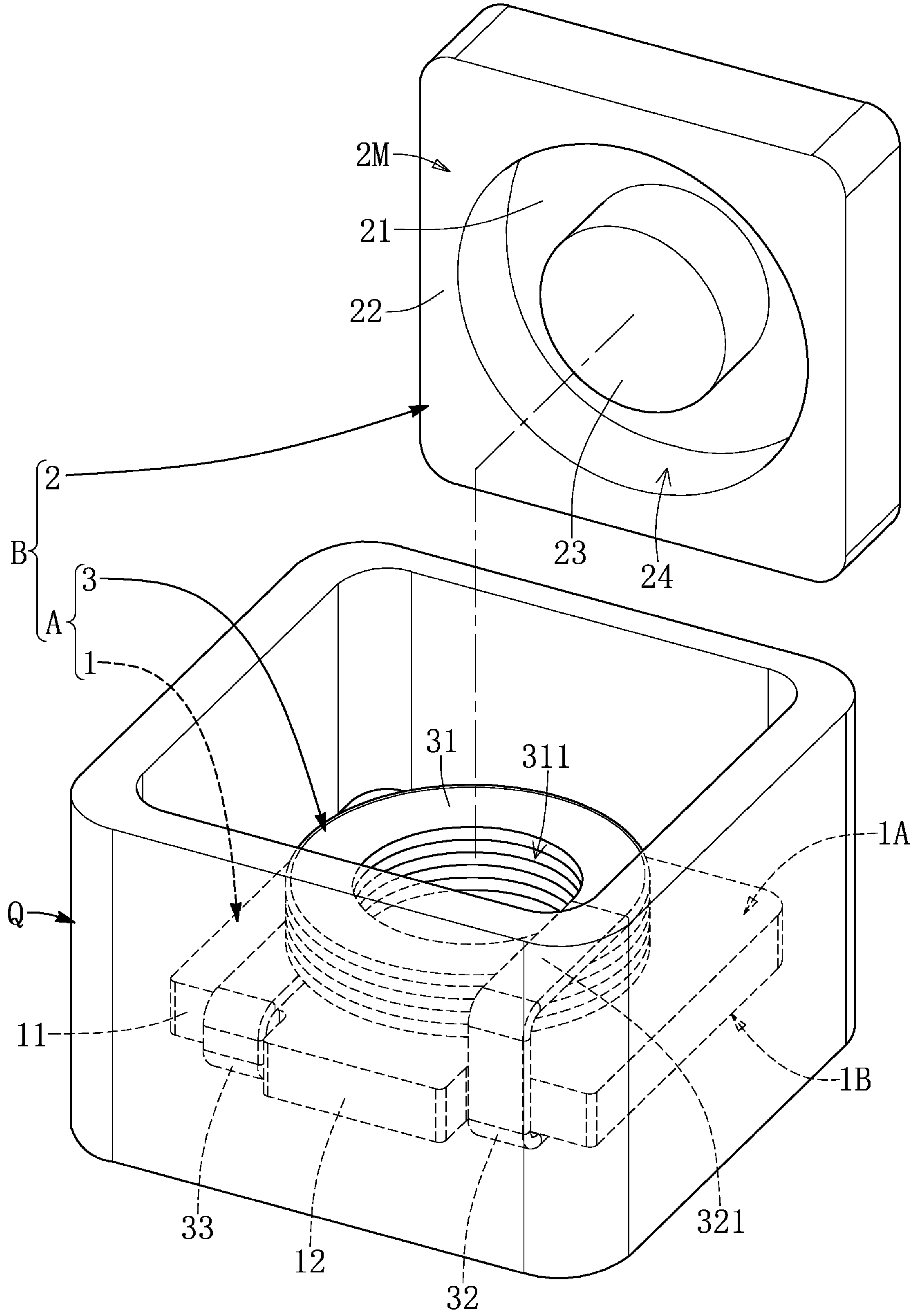
FIG. 8 is a schematic view of a placing process of the method for producing the magnetic device according to the first embodiment of the present disclosure.
Figure 9:
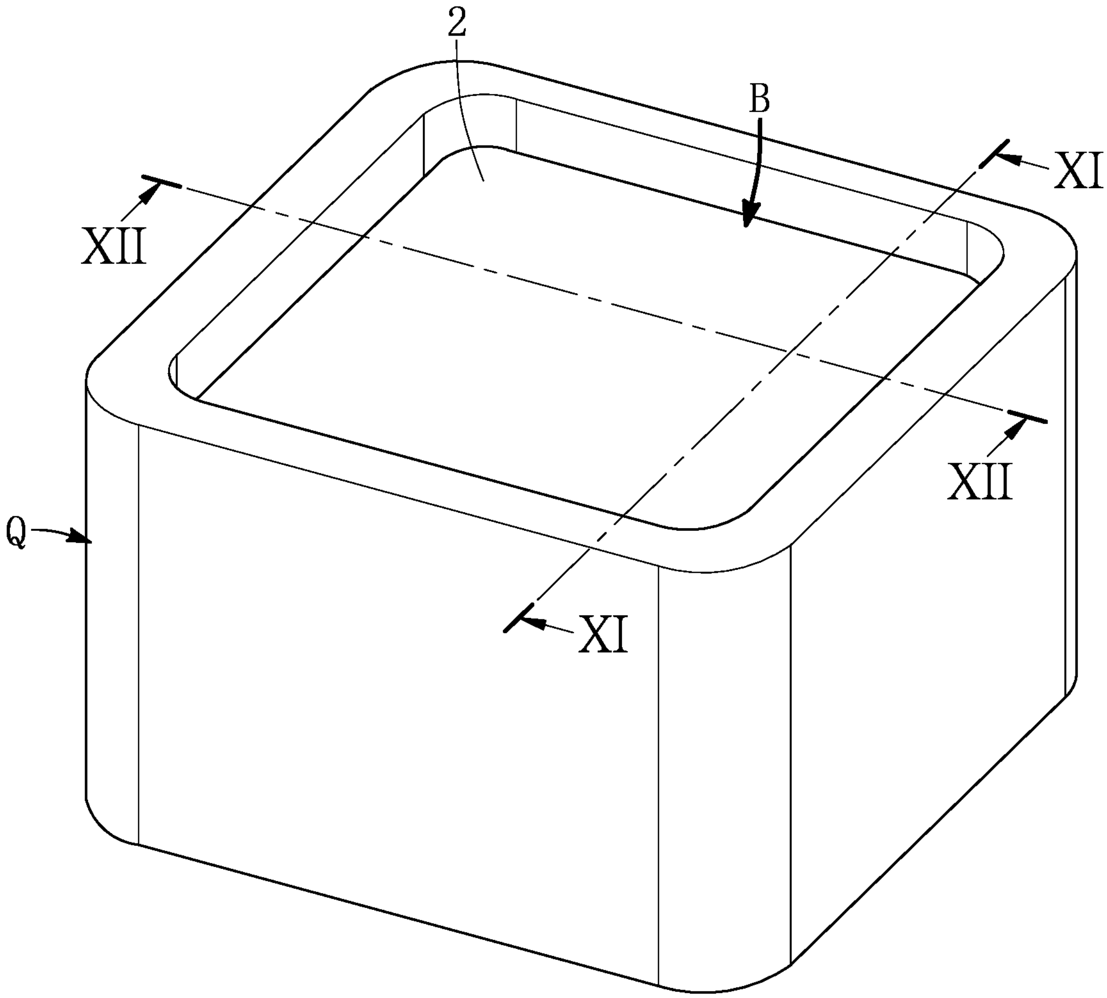
FIG. 9 is a schematic view before a forming process of the method for producing the magnetic device according to the first embodiment of the present disclosure.
Figure 10:
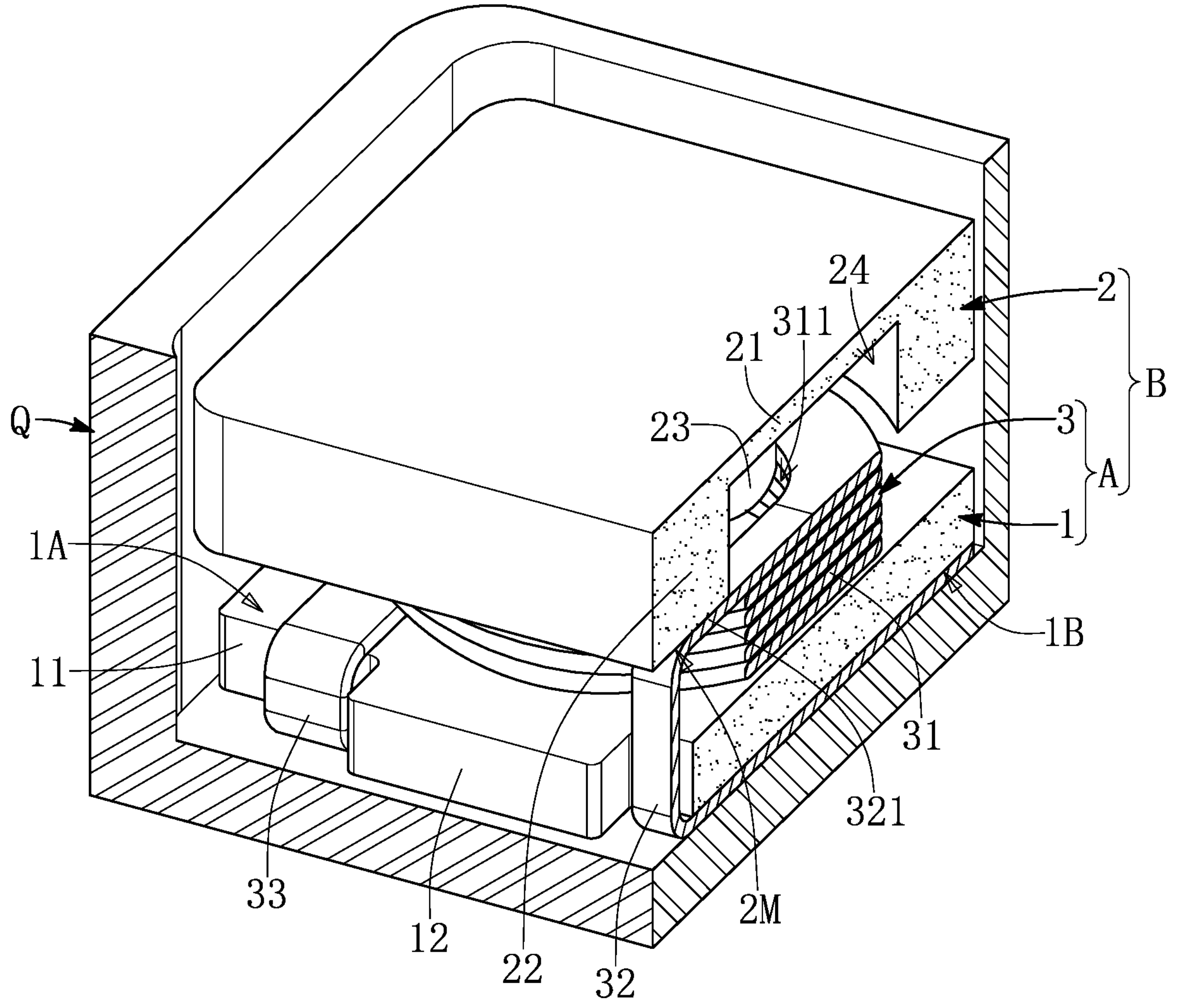
FIG. 10 is a partial schematic sectional view before the forming process of the method for producing the magnetic device according to the first embodiment of the present disclosure.
Figure 11:
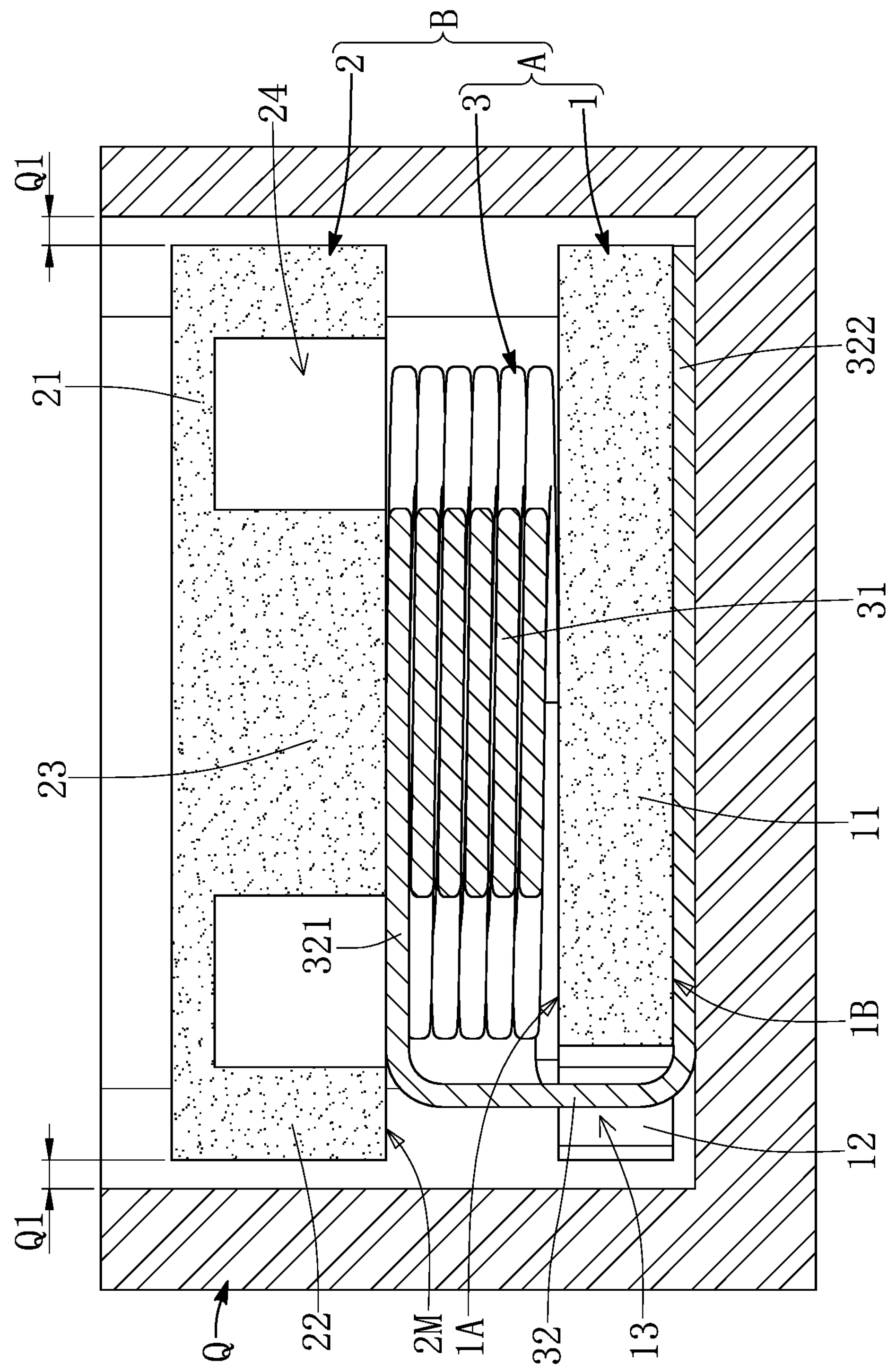
FIG. 11 and FIG. 12 are respectively schematic sectional views taken along line XI-XI and line XII-XII of FIG. 9.

Referring to FIG. 1 and FIG. 6 to FIG. 9, FIG. 5 to FIG. 7 are schematic views of the first semi-finished product produced in the coil assembling process of the method for producing the magnetic device according to the first embodiment of the present disclosure shown from different perspectives, FIG. 8 is a schematic views of a placing process of the method for producing the magnetic device according to the first embodiment of the present disclosure, and FIG. 9 is a schematic view before a forming process of the method for producing the magnetic device according to the first embodiment of the present disclosure.

The placing process S13 is implemented by placing the first semi-finished product A into a mold Q and placing the lid 2 onto the first semi-finished product A to form a second semi-finished product B. One portion of an end surface 2M of the lid 2 of the second semi-finished product B having the groove 24 correspondingly abuts against one section of the first end portion 32 adjacent to the top portion of the winding portion 31, the lid 2 is supported by a partial section 321 of the first end portion, the column 23 is correspondingly arranged above the center hole 311 of the winding portion 31, and the winding portion 31 is correspondingly arranged below the groove 24. The first notch 13 and the partial section 321 of the first end portion bending to the second side 1B through the first notch 13 are correspondingly arranged below the lid 2, and the second notch 14 and the partial section of the second end portion 33 bending to the second side 1B through the second notch 14 are corresponding arranged below the lid 2.

In the placing process S13 of the present embodiment, another end of the column 23 away from the bottom wall 21 does not extend into the center hole 311. Through this configuration, manufacturing of the lid 2 can be facilitated, but the present disclosure is not limited thereto. In the placing process S13 of one embodiment where the height 23H of the column 23 of the lid 2 is greater than the height 22H of the annular side wall 22, one portion of the another end of the column 23 away from the bottom wall 21 can extend into the center hole 311.

Figure 12:
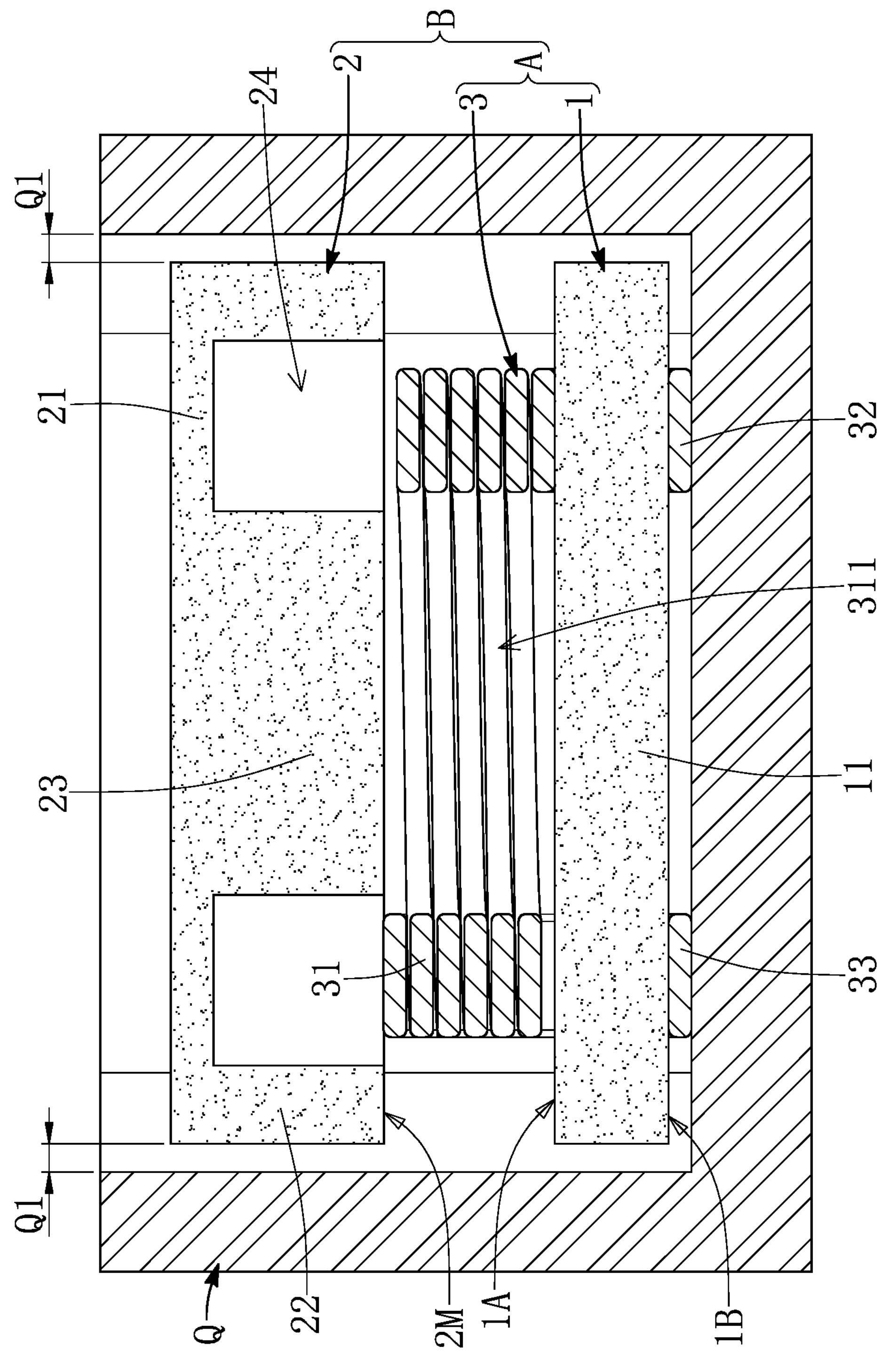
Figure 13:
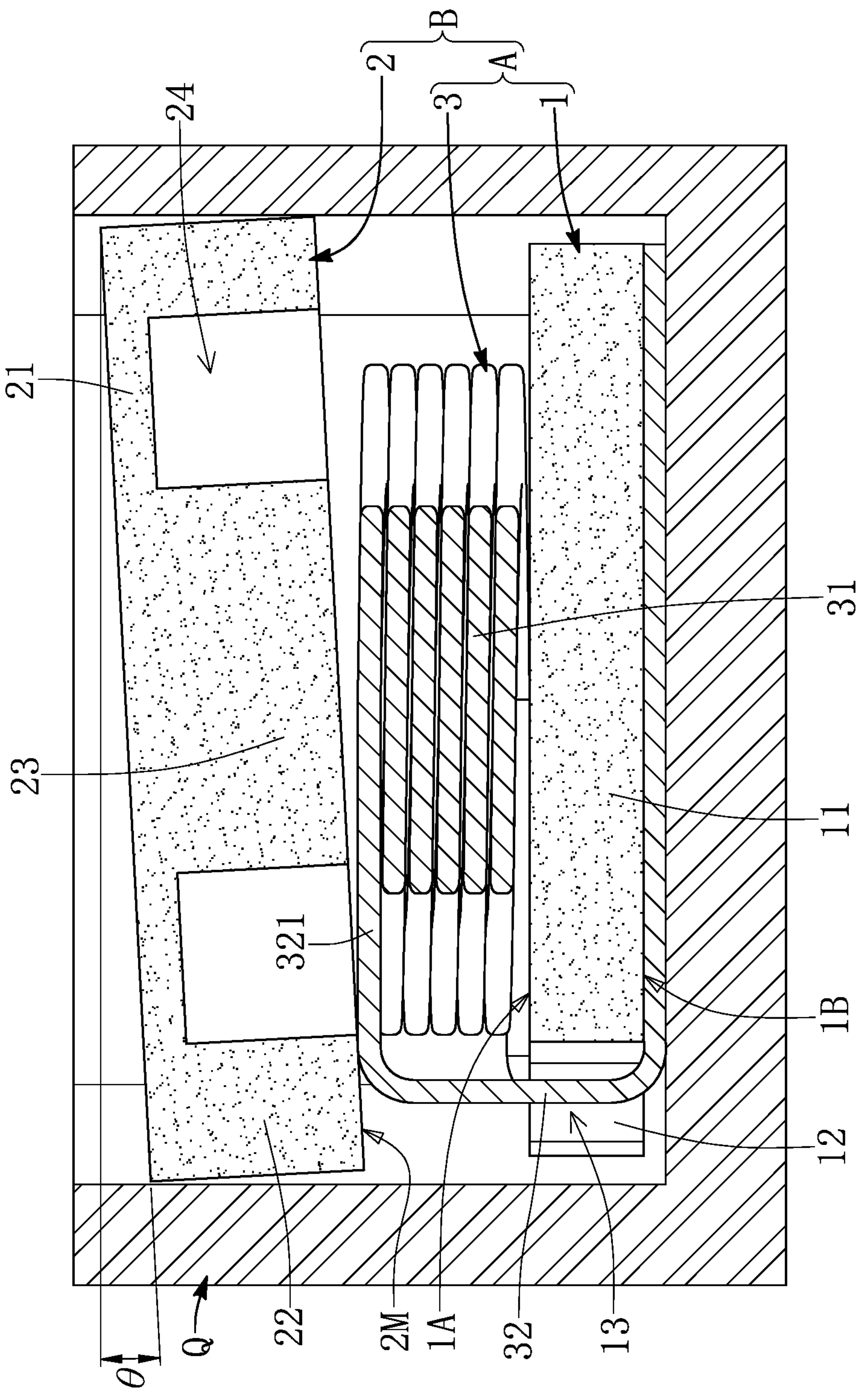
FIG. 13 is a schematic sectional view showing the lid tilting before the forming process of the method for producing the magnetic device according to the first embodiment of the present disclosure.
Figure 14:
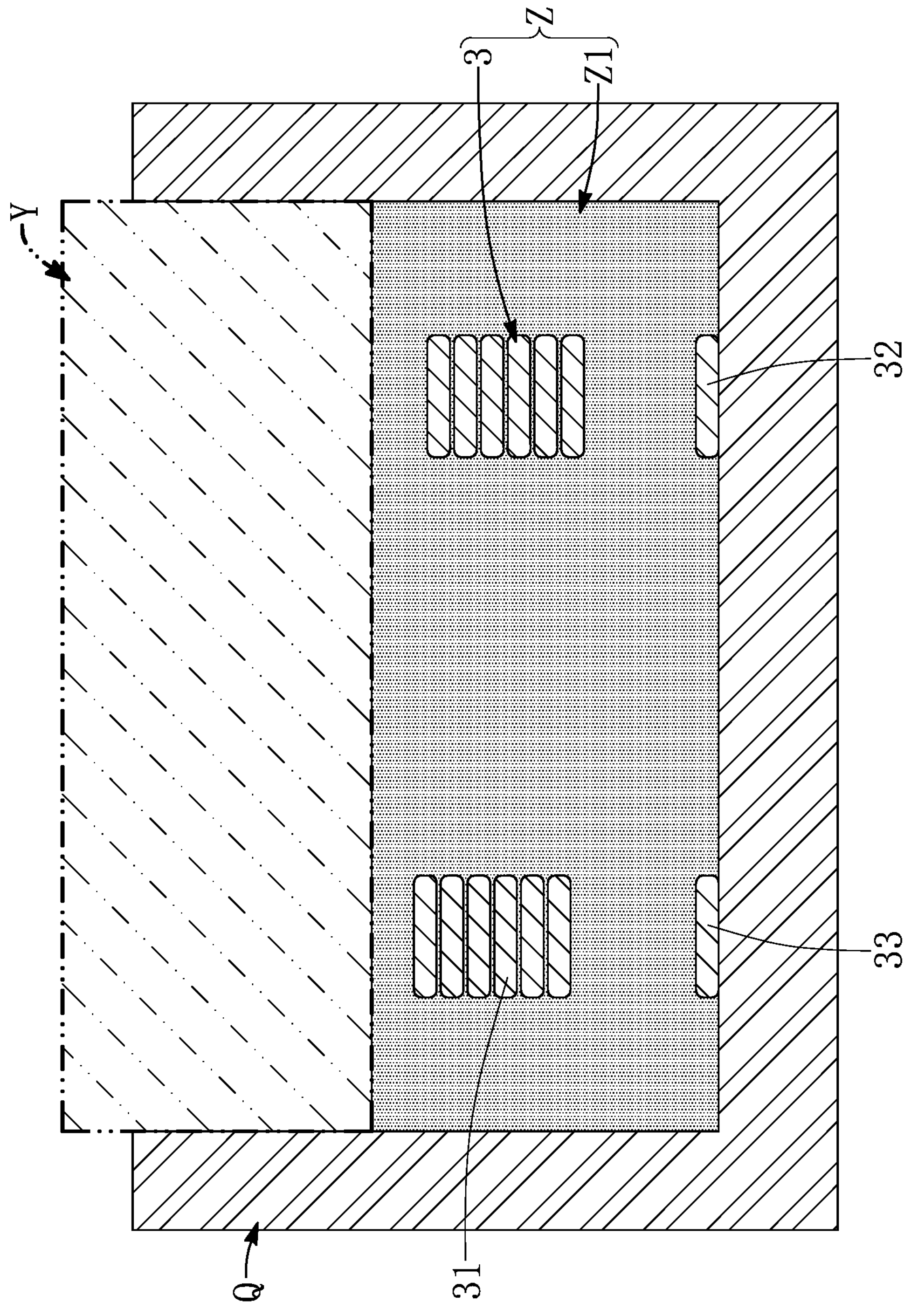
FIG. 14 is a schematic sectional view after the forming process of the method for producing the magnetic device according to the first embodiment of the present disclosure.

Referring to FIG. 12, FIG. 12 is a schematic sectional view taken along line XII-XII of FIG. 9. A predetermined gap Q1 between an outer periphery of the lid 2 and an inner side wall of the mold Q is less than a predetermined value. In addition, the lid 2 cannot tilt over 0 degrees in the mold Q, and 0 can be, for example, within a range from 3 to 30. The predetermined value can be, for example, 0.2 mm, and is preferably 0.05 mm. In other words, the predetermined gap Q1 between the outer periphery of the lid 2 and the inner side wall of the mold Q in the placing process S13 can be less than or equal to 0.08 mm. Preferably, the predetermined gap Q1 is less than or equal to 0.05 mm.

The forming process S14 is implemented by pressurizing the second semi-finished product B (e.g., utilizing a stamping device Y to pressurize in a direction opposite to a direction from the lid 2 to the bottom seat 1), such that the lid 2 and the bottom seat 1 of the second semi-finished product B are melted and connected to each other to form the main body Z1. The winding portion 31 is correspondingly arranged in the main body Z1, and the another end of the first end portion 32 and the another end of the second end portion 33 are exposed from the main body Z1. In a practical application, in the forming process S14, the mold Q is heated at the same time. In other words, the second semi-finished product B is heated and pressurized at the same time. Naturally, the forming process S14 can be implemented without simultaneously heating the second semi-finished product B, such that the second semi-finished product B is pressurized at a room temperature (e.g., from 20° C. to 25° C., which is commonly known as cold pressing).

It should be noted that, in a practical application, after the forming process S14, if the another end of the first end portion 32 and the another end of the second end portion 33 are not correspondingly exposed from the main body Z1, the main body Z1 can be partially removed in a post-processing manner, such that at least one portion of the another end of the first end portion 32 and at least one portion of the another end of the second end portion 33 are exposed from the main body Z1.

In a practical application, in the preparing process S11, the bottom seat 1 and the lid 2 can be produced by the same magnetic mixture. In the forming process S14, when the bottom seat 1 and the lid 2 are heated and pressurized, the magnetic mixture originally forming the bottom seat 1 and the lid 2 is gradually converted into a near liquid state, and flows around the coil 3. Eventually, the magnetic mixture originally forming the bottom seat 1 and the lid 2 melts to form the main body Z1, and the coil 3 is encompassed in the main body Z1.

Naturally, in the preparing process S11, if the bottom seat 1 and the lid 2 are respectively produced by different magnetic mixtures, the magnetic mixture originally forming the bottom seat 1 may be mostly arranged at a bottom portion of the mold Q, and the magnetic mixture originally forming the lid 2 may be mostly arranged at an outer periphery of the coil 3. From a sectional view of the main body Z1 of the finally-produced magnetic device Z, a borderline of the two magnetic mixtures may be observed.

Referring to FIG. 15, FIG. 15 is a schematic view of the magnetic device produced by the method for producing the magnetic device according to the first embodiment of the present disclosure. The magnetic device Z produced by the method of the present disclosure can serve as an inductor. The magnetic device Z include the main body Z1 and the coil 3, the coil 3 is encompassed by the main body Z1, another end 322 of the first end portion 32 and another end 331 of the second end portion 33 of the coil 3 are exposed from a side surface of the main body Z1, and the another end 322 of the first end portion 32 and the another end 331 of the second end portion 33 can be used as electrodes of the magnetic devices Z.

Figure 16:
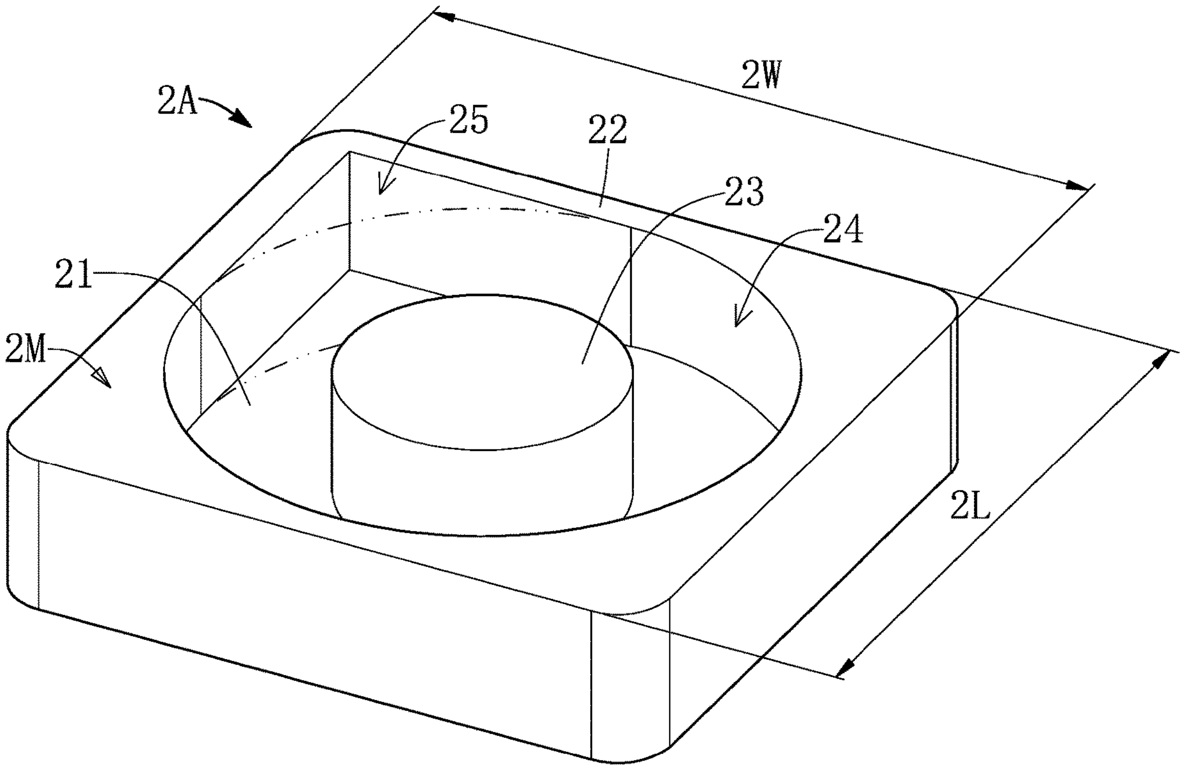
FIG. 16 is a flowchart of the method for producing the magnetic device according to a second embodiment of the present disclosure.

Referring to FIG. 16, FIG. 16 is a schematic flowchart of the method for producing the magnetic device according to a second embodiment of the present disclosure. The method of the present embodiment is configured to produce a magnetic device that includes an integrally formed main body. The method of the present embodiment includes a preparing process S21, a coil assembling process S22, a placing process S23, and a forming process S24.

Figure 17:
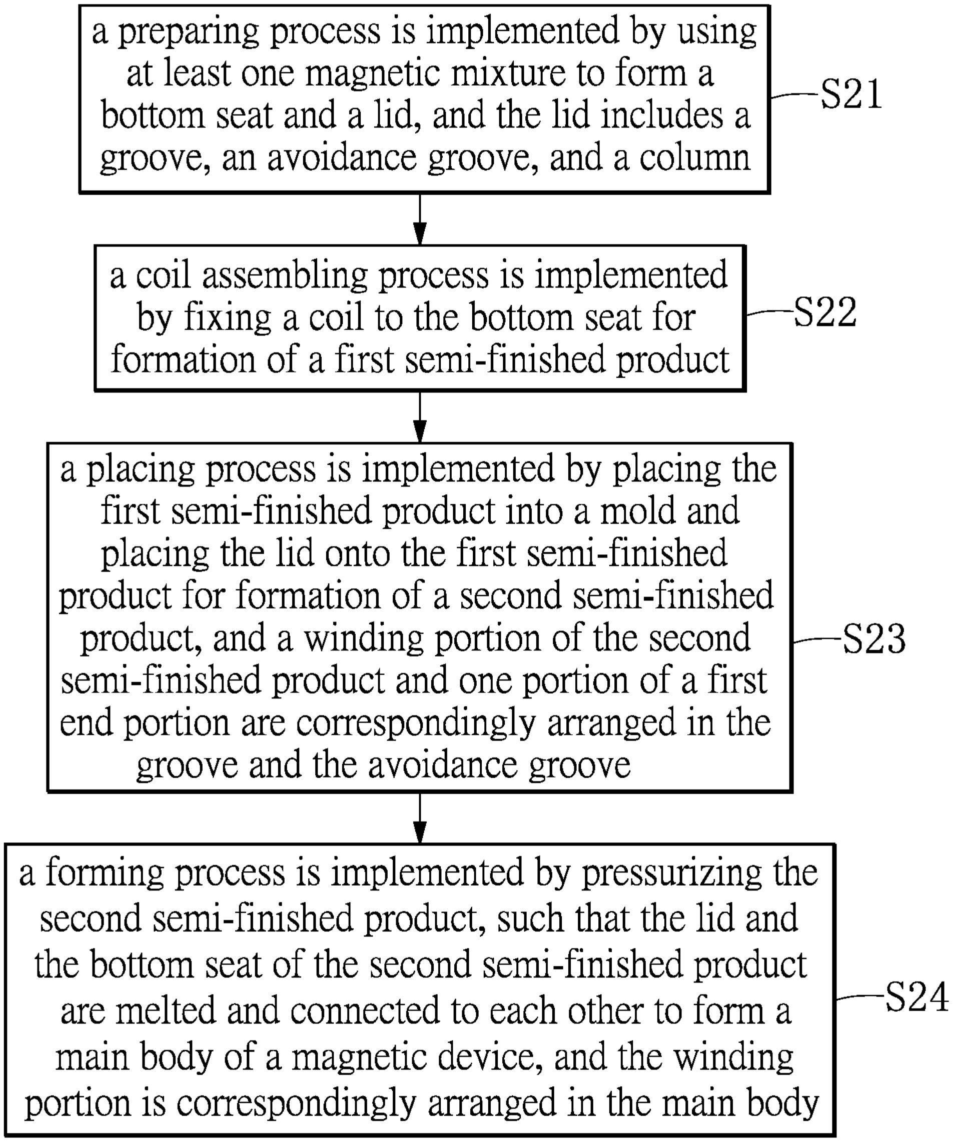
FIG. 17 is a schematic sectional view of the lid produced in the preparing process of the method for producing the magnetic device according to the second embodiment of the present disclosure.
Figure 18:
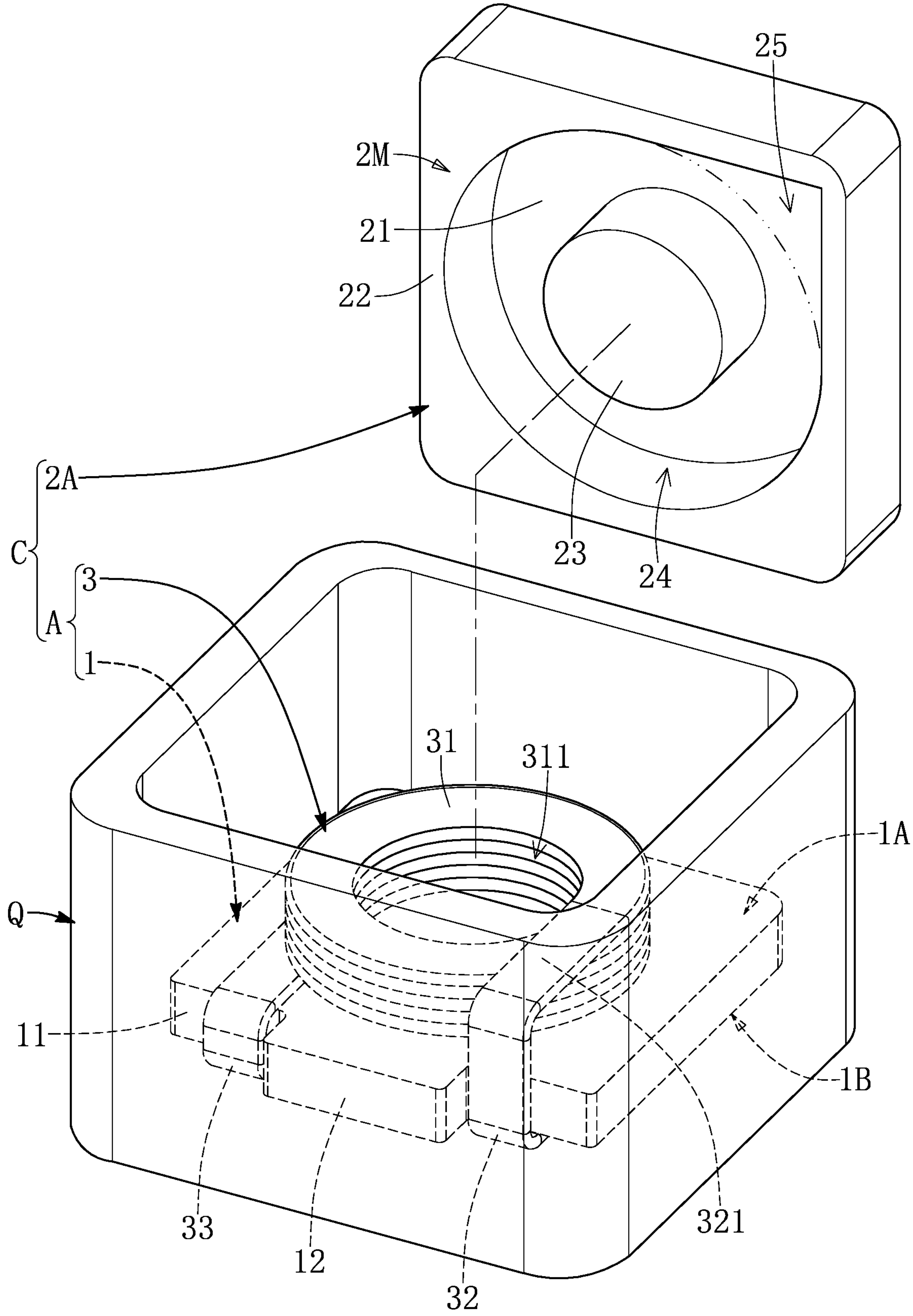
FIG. 18 is a schematic view of the placing process of the method for producing the magnetic device according to the second embodiment of the present disclosure.

Referring to FIG. 16 and FIG. 17, FIG. 17 is a schematic sectional view of the lid produced in the preparing process of the method for producing the magnetic device according to the second embodiment of the present disclosure. The preparing process S21 is implemented by using one or more magnetic mixture to produce a bottom seat 1 and a lid 2A. One side of the lid 2A is recessed to form a groove 24 and an avoidance groove 25 in spatial communication with the groove 24, and the lid 2A includes a column 23 arranged in the groove 24. The only difference between the lid 2A mentioned herein and the lid 2 of the previous embodiment is that the lid 2A of the present embodiment further includes the avoidance groove 25, and other parts of the lid 2A of the present embodiment are the same as those of the lid 2 of the previous embodiment, which will not be reiterated herein. The structure of the avoidance groove 25 can be designed according to the structure of a first end portion 32 arranged at a top portion 31A of a winding portion 31.

The coil assembling process S22 is implemented by fixing a coil 3 to the bottom seat 1 to form a first semi-finished product A. The first semi-finished product A mentioned herein is the same as the first semi-finished product A of the previous embodiment, for which detailed descriptions can be referred to in the previous embodiment, and will not be reiterated herein.

Figure 19:
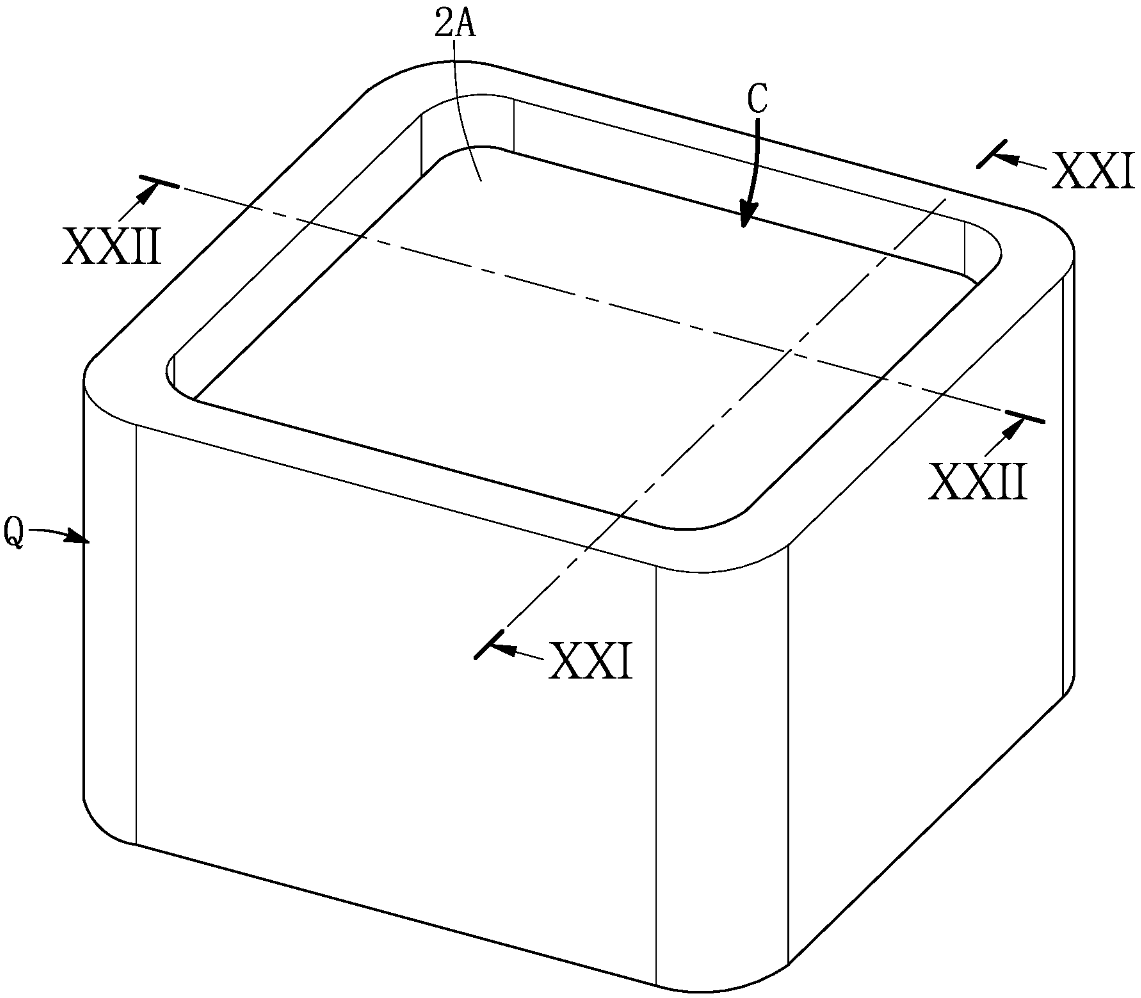
FIG. 19 is a schematic view before the forming process of the method for producing the magnetic device according to the second embodiment of the present disclosure.
Figure 20:
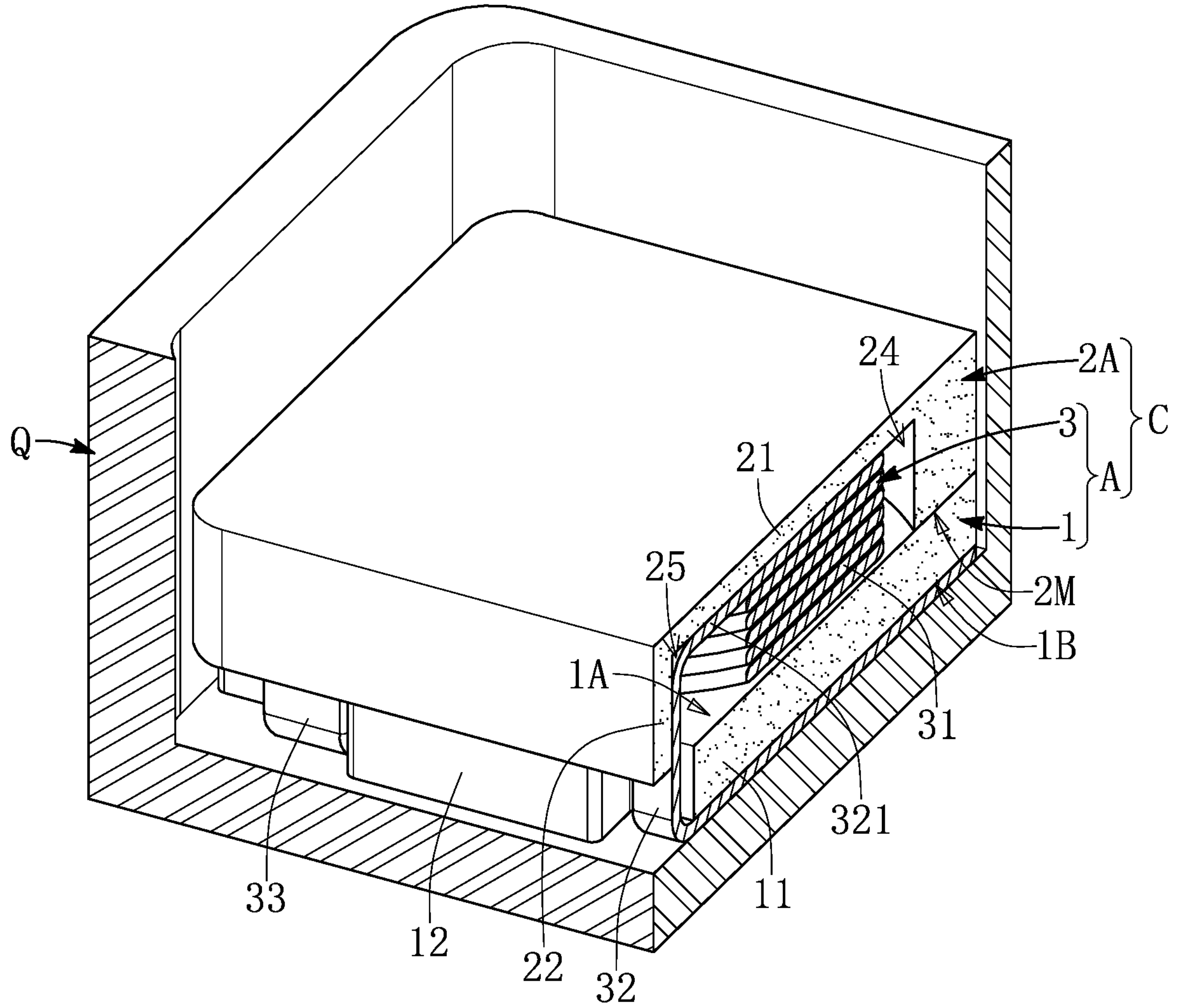
FIG. 20 is a partial schematic sectional view before the forming process of the method for producing the magnetic device according to the second embodiment of the present disclosure.
Figure 21:
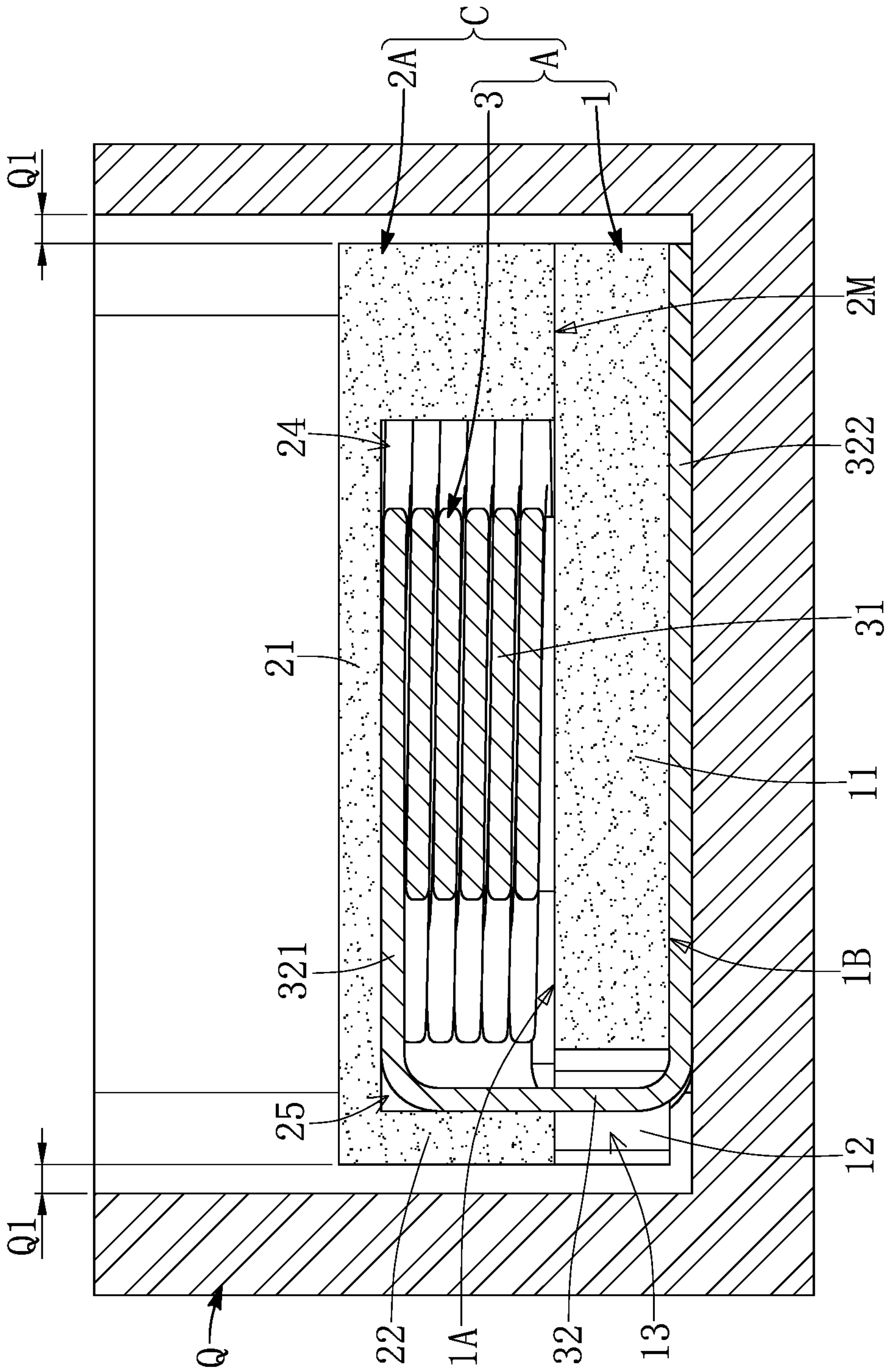
FIG. 21 and FIG. 22 are respectively schematic sectional views taken along line XXI-XXI and line XXII-XXII of FIG. 19.
Figure 22:
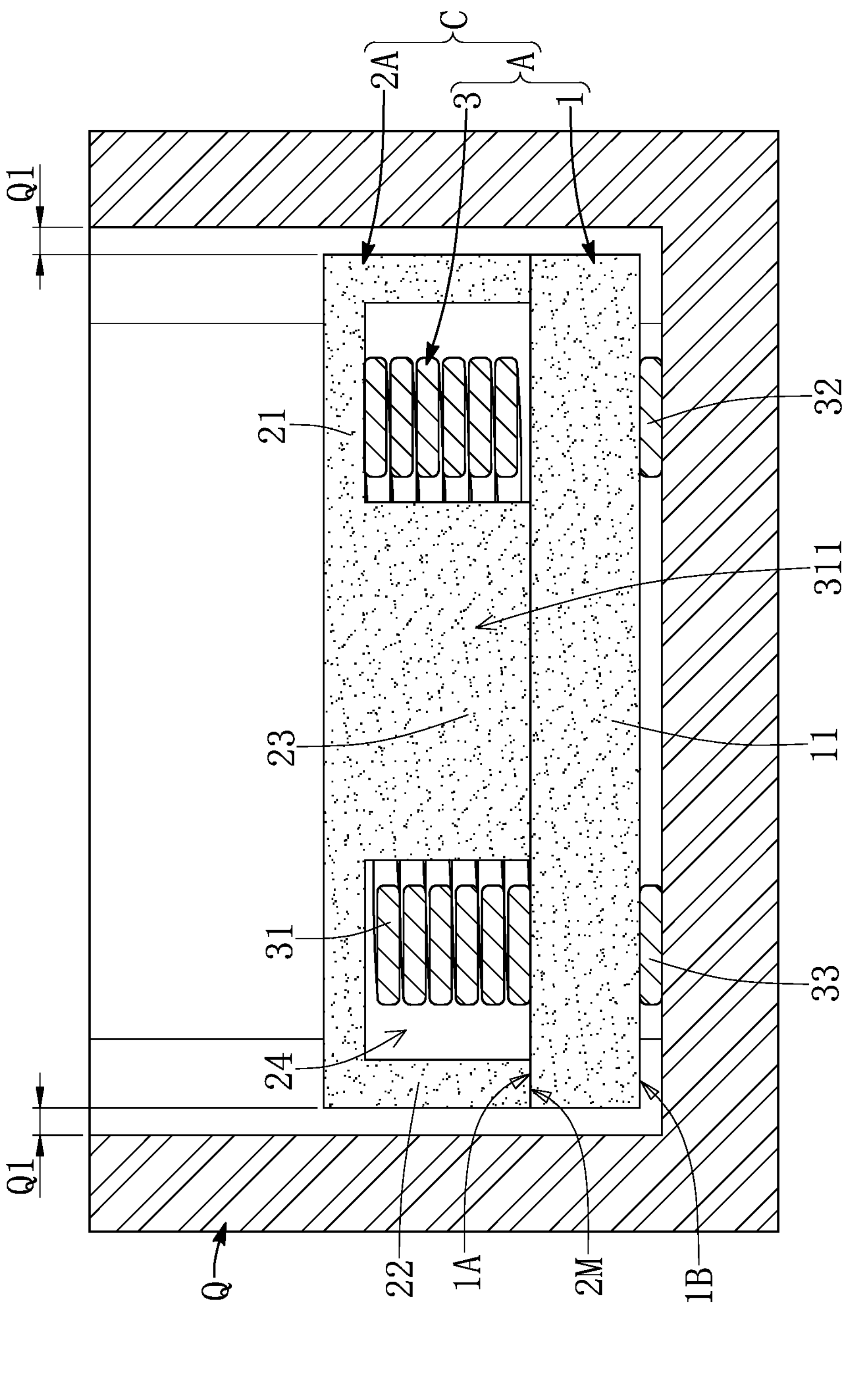

Referring to FIG. 18 to FIG. 22, FIG. 18 is a schematic view of the placing process of the method for producing the magnetic device according to the second embodiment of the present disclosure, FIG. 19 is a schematic view before the forming process of the method for producing the magnetic device according to the second embodiment of the present disclosure, FIG. 20 is a schematic partial sectional view before the forming process of the method for producing the magnetic device according to the second embodiment of the present disclosure, and FIG. 21 and FIG. 22 are schematic sectional views respectively taken along line XXI-XXI and line XXII-XXII of FIG. 19.

The placing process S23 is implemented by placing the first semi-finished product A into a mold Q and placing the lid 2A onto the first semi-finished product A to form a second semi-finished product C. The winding portion 31 of the second semi-finished product C is correspondingly arranged in the groove 24, one section of the first end portion 32 connected to the top portion 31A of the winding portion 31 is correspondingly arranged in the avoidance groove 25, the column 23 is correspondingly arranged in a center hole 311, another end of the column 23 away from a bottom wall 21 can correspondingly abut against a first side of a bottom portion 31B, and an end surface 2M of an annular side wall 22 of the lid 2A can correspondingly abut against the first side of the bottom portion 31B. In other words, the avoidance groove 25 is configured to accommodate the section of the first end portion 32 that is connected to the top portion 31A of the winding portion 31. In this way, one portion of the coil 3 of the second semi-finished product C arranged at the first side of the bottom seat 1 can be accommodated in the groove 24 and the avoidance groove 25 of the lid 2A.

The forming process S24 is implemented by pressurizing the semi-finished product C, such that the lid 2A and the bottom seat 1 of the second semi-finished product C are melted and connected to each other to form a main body Z1 (as shown in FIG. 15). The winding portion 31 is correspondingly arranged in the main body Z1, and another end 322 (as shown in FIG. 15) of the first end portion 32 and another end 331 (as shown in FIG. 15) of a second end portion 33 are exposed from the main body Z1. Except for the second semi-finished product C placed in the mold Q, the forming process S24 of the present embodiment is the same as the forming process S14 of the previous embodiment, and will not be reiterated herein. In a practical application, in the forming process S24, the mold Q is heated at the same time. In other words, the second semi-finished product C is heated and pressurized at the same time. Naturally, the forming process S24 can be implemented without simultaneously heating the second semi-finished product C, such that the second semi-finished product C is pressurized at a room temperature (e.g., from 20° C. to 25° C., which is commonly known as cold pressing).

It is worth mentioning that, in a practical application of any one of the above-mentioned embodiments, relevant personnel can correspondingly adjust an overall height of the lid according to differences of the magnetic mixtures that form the bottom seat and the lid, so as to ensure that the magnetic mixtures originally forming the lid and the bottom seat in the forming process can effectively encompass the coil. In other words, the overall height of the lid can be changed according to the differences of the magnetic mixtures. Similarly, relevant personnel can adjust the structure of the lid, an overall thickness of the bottom seat, and the structure of the bottom seat according to different types of the coil, so as to ensure that the magnetic mixtures originally forming the lid and the bottom seat in the forming process can effectively encompass the coil.

Figure 23:
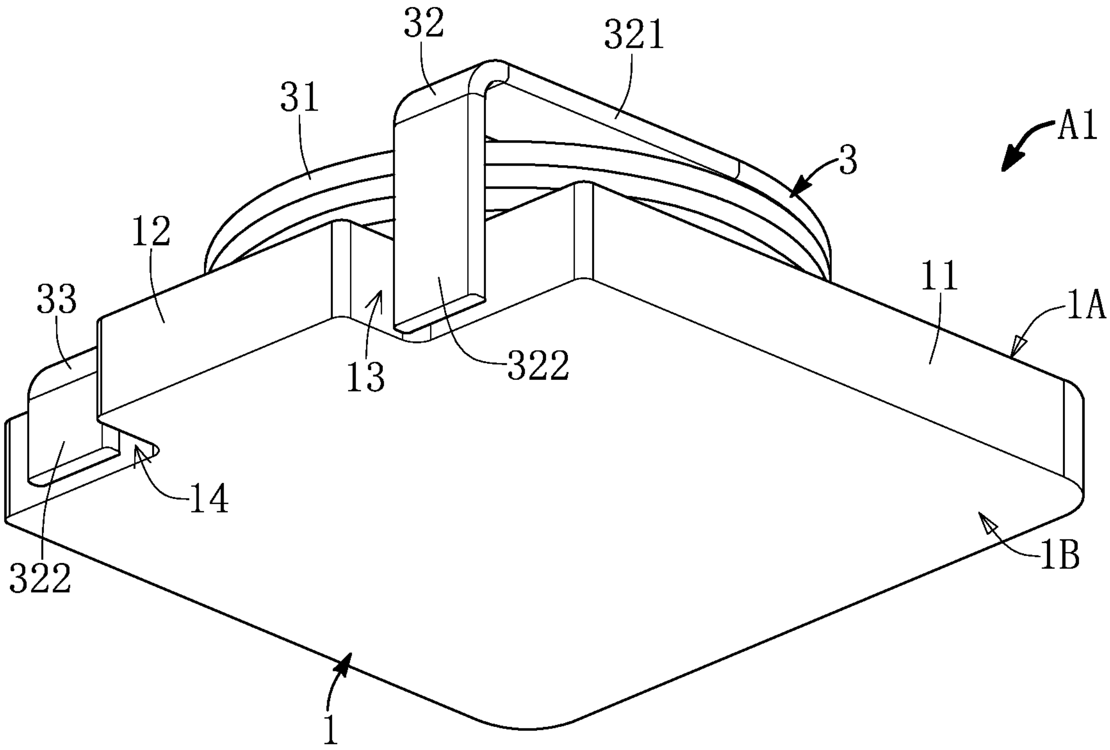
FIG. 23 to FIG. 26 are schematic views of the first semi-finished products produced in the coil assembling process of the method for producing the magnetic device according to other embodiments of the present disclosure.

Referring to FIG. 23 to FIG. 26, FIG. 23 to FIG. 26 are schematic views of the first semi-finished products produced by the coil assembling process of the method for producing the magnetic device according to other embodiments of the present disclosure. As shown in FIG. 23, in a different embodiment, the another end of the first end portion 32 of the coil 3 of the first semi-finished product A1 away from the one end connected to the winding portion 31 bends from the first side 1A of the bottom seat 1 to the second side 1B through the first notch 13, but the another end 322 of the first end portion 32 does not bend to the second side 1B of the bottom seat 1. In addition, one portion of the another end of the first end portion 32 away from the one end connected to the winding portion 31 is flush with a bottom surface of the bottom seat 1. The another end of the second end portion 33 of the coil 3 away from the one end connected to the winding portion 31 bends from the first side 1A of the bottom seat 1 to the second side 1B through the second notch 14, but the another end 331 of the second end portion 33 does not bend to the second side 1B of the bottom seat 1. In addition, one portion of the another end of the second end portion 33 away from the one end connected to the winding portion 31 is flush with the bottom surface of the bottom seat 1. After the forming process, the one portion of the first end portion 32 that is flush with the bottom surface of the bottom seat 1 and the one portion of the second end portion 33 that is flush with the bottom surface of the bottom seat 1 are exposed from the main body Z1 (as shown in FIG. 15).

Figure 24:
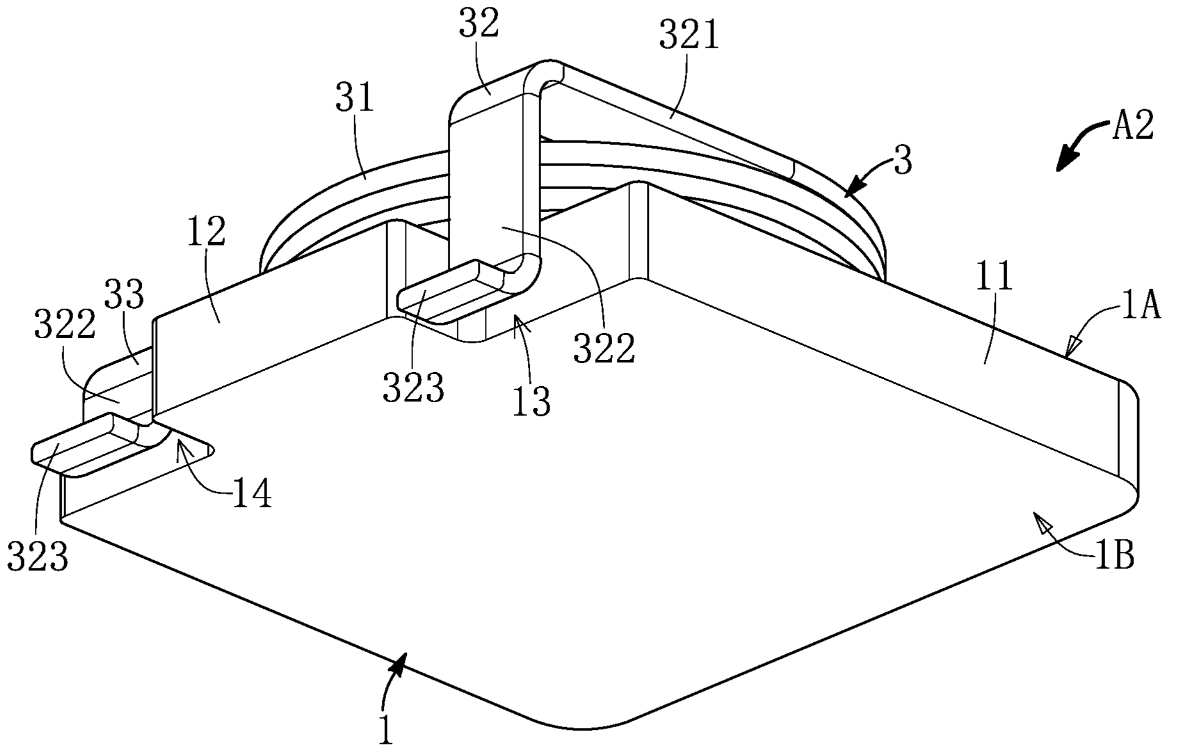

Referring to FIG. 24, in a different embodiment, the another end of the first end portion 32 of the coil 3 of the first semi-finished product A2 away from the one end connected to the winding portion 31 bends from the first side 1A of the bottom seat 1 to the second side 1B through the first notch 13, but the another end 322 of the first end portion 32 does not bend to the second side 1B of the bottom seat 1. The another end 322 of the first end portion 32 bends in a direction away from the winding portion 31 to form a first end bending portion 323, and one portion of the first end bending portion 323 is flush with the bottom surface of the bottom seat 1. The another end of the second end portion 33 of the coil 3 away from the one end connected to the winding portion 31 bends from the first side 1A of the bottom seat 1 to the second side 1B through the second notch 14, but the another end 331 of the second end portion 33 does not bend to the second side 1B of the bottom seat 1. The another end 331 of the second end portion 33 bends in the direction away from the winding portion 31 to form a second end bending portion 332, and one portion of the second end bending portion 332 is flush with the bottom surface of the bottom seat 1. After the forming process, the one portion of the first end bending portion 323 that is flush with the bottom surface of the bottom seat 1 and the one portion of the second end bending portion 332 that is flush with the bottom surface of the bottom seat 1 are exposed from the main body Z1 (as shown in FIG. 15).

Figure 25:
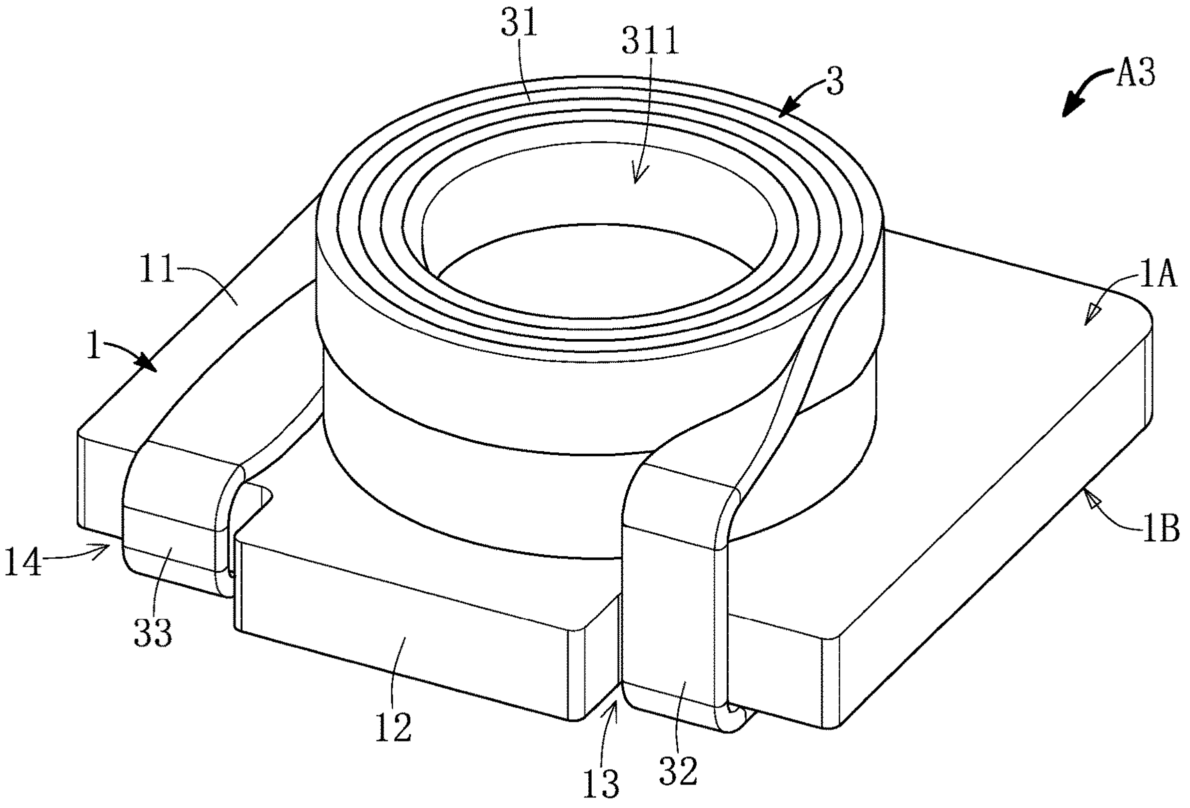

Referring to FIG. 25, in one different embodiment, a winding manner of the winding portion 31 of a first semi-finished product A3 can be as follows. A wide side surface of a flat enameled wire faces toward a central axis and rotates relative to the central axis, and the resulted winding state is as shown in FIG. 25. In FIG. 25, after bending, the another end of the first end portion 32 and the another end of the second end portion 33 included in the coil 3 are arranged at the second side 1B of the bottom seat 1. However, in a practical application, the another end of the first end portion 32 and the another end of the second end portion 33 are not limited to being arranged at the second side 1B of the bottom seat 1 after bending. For example, in one configuration of the present embodiment, the another end of the first end portion 32 and the another end of the second end portion 33 can have the same configuration as that of the another end of the first end portion 32 and the another end of the second end portion 33 shown in FIG. 23 or FIG. 24.

Figure 26:
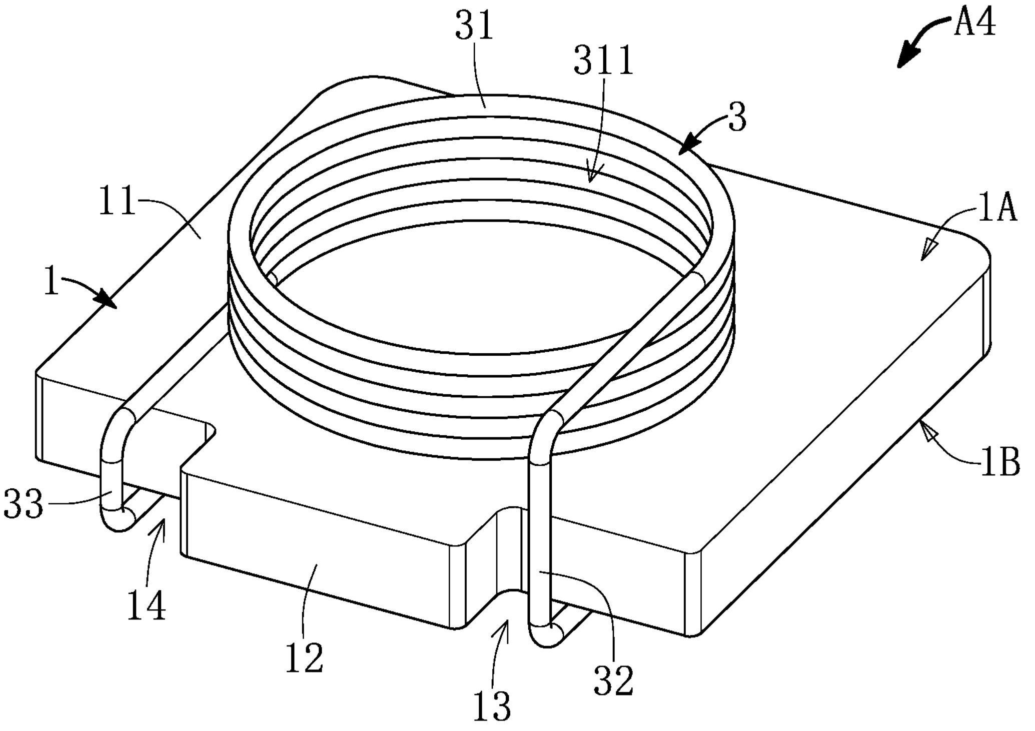

A main difference between a first semi-finished product A4 shown in FIG. 26 and the first semi-finished product A shown in FIG. 5 is as follows. While the coil 3 of the present embodiment is a round wire (i.e., a sectional surface of the coil 3 is substantially circular), the coil 3 in the embodiment shown in FIG. 5 is a flat wire. In FIG. 26, after bending, the another end of the first end portion 32 and the another end of the second end portion 33 included in the coil 3 are arranged at the second side 1B of the bottom seat 1. However, in a practical application, the another end of the first end portion 32 and the another end of the second end portion 33 are not limited to being arranged at the second side 1B of the bottom seat 1 after bending. For example, in one configuration of the present embodiment, the another end of the first end portion 32 and the another end of the second end portion 33 can have the same configuration as that of the another end of the first end portion 32 and the another end of the second end portion 33 shown in FIG. 23 or FIG. 24.

In one exemplary embodiment, after the forming process of the above-mentioned method for producing the magnetic device of the present disclosure, an insulation layer (e.g., a black paint) can be formed on the structure of the main body (e.g., in a coating manner), such that the insulation layer entirely encompasses the first end portion and the second end portion exposed from the main body. Afterwards, the insulation layer of the first end portion and the second end portion that are exposed from the main body and an insulation paint of the coil are removed by using laser, such that conductive structures of the first end portion and the second end portion are exposed. Finally, metal layers are formed on the conductive structures of the first end portion and the second end portion to serve as electrodes.

Beneficial Effects of the Embodiments

It should be noted that, in the above-mentioned processes of the method for producing the magnetic device provided by the present disclosure, no process for filling magnetic powders into the mold is included. In the method of the present disclosure, through the design of the above-mentioned processes, any potential issue caused by utilizing the magnetic powders to form a main body of a magnetic device during a conventional production process can be effectively solved.

More specifically, in one conventional method for producing an inductor (i.e., a magnetic device), a mold is disposed on a coil, magnetic powders are filled, and the magnetic powders are formed into a magnetic main body of the inductor in a heating and pressurizing manner. In the inductor produced in this method, a regional density of the magnetic main body at a central position of the coil and a regional density of the magnetic main body at a position outside the coil are relatively lower regional densities of the magnetic main body at other positions. The uneven density of the overall magnetic main body directly causes the inductor to have a poor magnetic property and poor reliability.

In another conventional method for producing the inductor, the coil is disposed on an inverted T-shaped bottom seat, and the coil and the inverted T-shaped bottom seat are jointly placed into the mold. Afterwards, the magnetic powders are filled into the mold, and the inverted T-shaped bottom seat and the magnetic powders are jointly formed into the magnetic main body of the inductor in the heating and pressurizing manner. An overall evenness of the magnetic main body of the inductor produced in this method is better than that of the magnetic main body of the inductor produced in the above-mentioned conventional method. However, in the magnetic main body produced by this method, since a difference between the regional density outside the coil and the densities of the magnetic main body at other regions is still too large, the magnetic property of the finally-formed inductor still has room for improvement. In addition, in the inductors produced by the two above-mentioned conventional methods, an issue of the coil shifting such as to not be located at the central position of the magnetic main body may easily occur.

In contrast, in the method for producing the magnetic device provided by the present disclosure, through the design of the preparing process, the coil assembling process, the placing process, and the forming process, issues of the inductors produced by the two above-mentioned conventional methods can be effectively improved. In the magnetic device produced by the method of the present disclosure, a density of the main body at each region is substantially uniform. Compared with the magnetic devices produced by the two above-mentioned conventional methods, the magnetic device of the present disclosure has a better magnetic property and better reliability.

It is worth mentioning that, a density evenness of the main body of each of the magnetic devices produced in the two embodiments of the present disclosure is better than that of the magnetic main body produced by way of magnetic powder filling. The density evenness of the main body and the magnetic property of the magnetic device produced in the first embodiment are better than those of the second embodiment.

Furthermore, in each of the inductors produced by the two above-mentioned conventional methods, the coil is difficult to be arranged at a central position of the magnetic main body, or can easily be tilted. As a result, each of the inductors has a poor magnetic property. In contrast, the winding portion of the coil included in the magnetic device produced by the method of the present disclosure is effectively arranged at a substantially central positon of the main body, the winding portion does not easily tilt, and the magnetic device can have a better magnetic property.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for producing a magnetic device, wherein the magnetic device includes a main body that is integrally formed, and the method comprises:

a preparing process implemented by using at least one magnetic mixture to form a bottom seat and a lid, wherein one side of the lid is recessed to form a groove, and the lid includes a column arranged in the groove;

a coil assembling process implemented by fixing a coil to the bottom seat for formation of a first semi-finished product, wherein the coil includes a winding portion, a first end portion, and a second end portion, one end of the first end portion is connected to a top portion of the winding portion, and one end of the second end portion is connected to a bottom portion of the winding portion, and wherein an outer diameter of the winding portion is less than a width of the bottom seat, the outer diameter of the winding portion is less than a length of the bottom seat, the outer diameter of the winding portion is less than an inner diameter of the groove, an inner diameter of a center hole of the winding portion is greater than an outer diameter of the column, and a depth of the groove is greater than or equal to a height of the winding portion;

a placing process implemented by placing the first semi-finished product into a mold and placing the lid onto the first semi-finished product for formation of a second semi-finished product, wherein an end surface of the lid of the second semi-finished product has the groove, one portion of the end surface of the lid of the second semi-finished product correspondingly abuts against one section of the first end portion that is adjacent to the top portion of the winding portion, the lid is supported by a partial section of the first end portion, the column is correspondingly arranged above the center hole of the winding portion, and the winding portion is correspondingly arranged below the groove; and a forming process implemented by pressurizing the second semi-finished product, such that the lid and the bottom seat included in the second semi-finished product are melted and connected to each other to form the main body, wherein the winding portion is correspondingly arranged in the main body, and one portion of another end of the first end portion and one portion of another end of the second end portion are exposed from the main body.

2. The method according to claim 1, wherein, in the placing process, a predetermined gap between an outer periphery of the lid and an inner side wall of the mold is less than or equal to 0.2 mm.

3. The method according to claim 1, wherein, in the preparing process, the lid includes a bottom wall, an annular side wall, and the column, the annular side wall being disposed around the bottom wall, and one end of the column being disposed on the bottom wall; wherein the bottom wall, the annular side wall, and the column jointly define the groove, and a height of the column is less than or equal to a height of the annular side wall; wherein, in the placing process, another end of the column away from the bottom wall does not extend into the center hole.

4. The method according to claim 1, wherein the bottom seat formed in the preparing process has a base and a protrusion, the protrusion is connected to one side of the base, and a width of the protrusion is less than a width of the base; wherein, at the one side of the base, the protrusion and the base jointly define a first notch and a second notch; wherein a sum of a length of the base and a length of the protrusion is greater than or equal to a length of the lid, and the width of the base is greater than or equal to a width of the lid; wherein, in the coil assembling process, the partial section of the first end portion is arranged at the first notch, and a partial section of the second end portion is arranged at the second notch; wherein, in the placing process, the first notch and the partial section of the first end portion that bends from a first side of the bottom seat to a second side of the bottom seat through the first notch are correspondingly arranged below the lid, and the second notch and the partial section of the second end portion that bends from the first side to the second side through the second notch are correspondingly arranged below the lid.

5. The method according to claim 4, wherein, in the coil assembling process, the partial section of the first end portion bends toward the second side through the first notch, the another end of the first end portion is arranged at the second side of the bottom seat, the partial section of the second end portion bends toward the second side through the second notch, and the another end of the second end portion is arranged at the second side of the bottom seat.

6. The method according to claim 1, wherein, in the preparing process, one of the at least one magnetic mixture is used to produce the bottom seat and the lid.

7. The method according to claim 1, wherein, in the preparing process, a quantity of the at least one magnetic mixture is more than one, and wherein one of the magnetic mixtures that is used to produce the bottom seat is different from another one of the magnetic mixtures that is used to produce the lid.

* * * * *